United States Patent
Whitefield et al.

(10) Patent No.: US 10,938,652 B1
(45) Date of Patent: Mar. 2, 2021

(54) GATEWAY DIVERSITY SWITCHING

(71) Applicant: Hughes Network Systems, LLC, Germantown, MD (US)

(72) Inventors: David Whitefield, Gaithersburg, MD (US); Robert James Torres, New Market, MD (US); John Leonard Border, Middletown, MD (US); David Alan Roos, Boyds, MD (US); Stanley Edward Kay, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/546,060

(22) Filed: Aug. 20, 2019

(51) Int. Cl.
  *G06F 15/16* (2006.01)
  *H04L 12/24* (2006.01)
  *H04L 29/06* (2006.01)

(52) U.S. Cl.
  CPC ...... *H04L 41/0816* (2013.01); *H04L 41/0896* (2013.01); *H04L 65/104* (2013.01)

(58) Field of Classification Search
  CPC ............. H04L 41/0816; H04L 41/0896; H04L 65/104
  USPC ........................................................ 709/223
  See application file for complete search history.

(56) References Cited

U.S. PATENT DOCUMENTS

| | | | | |
|---|---|---|---|---|
| 7,535,870 B2* | 5/2009 | Nikander | .......... | H04W 36/0016 370/331 |
| 7,640,036 B2* | 12/2009 | Kallio | ............... | H04W 36/0066 455/552.1 |
| 7,689,722 B1* | 3/2010 | Timms | .................. | H04L 63/164 709/249 |
| 7,751,819 B2* | 7/2010 | Isobe | .................... | H04W 28/02 455/436 |
| 7,773,942 B2 | 8/2010 | Hudson et al. | | |
| 7,953,044 B2* | 5/2011 | Xia | ........................ | H04W 36/02 370/331 |
| 8,068,480 B2* | 11/2011 | Yamamoto | ........ | H04W 36/0011 370/352 |

(Continued)

OTHER PUBLICATIONS

Blandine Bianchi, et al., Rainfall Nowcasting by Combining Radars, Microwave Links and Rain Gauges, Oct. 2018, pp. 1-21.

(Continued)

*Primary Examiner* — Moustafa M Meky
(74) *Attorney, Agent, or Firm* — NovoTechIP International PLLC

(57) ABSTRACT

A method of switching from a first gateway within a plurality of first gateways to a second gateway in a network includes precaching configuration information on the second gateway, that is within the first gateways, prior to switch-over to the second gateway. The first gateway from which the second gateway is being switched is identified. The second gateway is configured in accordance with the configuration of the first gateway based on the precached configuration information prior to the switch-over to the second gateway. Data traffic from data applications using the network is replicated and sent to the first gateway and the second gateway. Bandwidths allocated to terminals in the network are frozen in association with the switch-over to the second gateway. The bandwidths allocated to the terminals in the network are unfrozen based at least in part on an indication of completion of the switch-over to the second gateway.

20 Claims, 4 Drawing Sheets

(56) References Cited

U.S. PATENT DOCUMENTS

| | | | |
|---|---|---|---|
| 8,243,686 B2* | 8/2012 | Bhalla | H04W 36/0066 |
| | | | 370/331 |
| 8,289,841 B2* | 10/2012 | Masuya | H04L 45/586 |
| | | | 370/218 |
| 8,873,511 B2* | 10/2014 | Bhalla | H04W 36/0022 |
| | | | 370/331 |
| 9,356,685 B2 | 5/2016 | Angeletti | |
| 9,596,213 B2* | 3/2017 | Pham | H04L 63/0236 |
| 10,104,177 B2 | 10/2018 | Roy et al. | |
| 10,136,373 B2* | 11/2018 | Baudoin | H04B 7/1851 |
| 2008/0055153 A1 | 3/2008 | Hudson et al. | |
| 2008/0198807 A1* | 8/2008 | Xia | H04W 36/02 |
| | | | 370/331 |
| 2009/0252155 A1* | 10/2009 | Masuya | H04L 47/10 |
| | | | 370/352 |
| 2011/0274091 A1* | 11/2011 | Nikander | H04W 40/02 |
| | | | 370/331 |
| 2013/0109299 A1 | 5/2013 | Ross et al. | |
| 2015/0081888 A1* | 3/2015 | Pham | H04L 63/0236 |
| | | | 709/224 |
| 2015/0365320 A1* | 12/2015 | Xu | H04L 45/245 |
| | | | 370/226 |
| 2017/0339616 A1* | 11/2017 | Baudoin | H04W 36/023 |
| 2018/0123891 A1* | 5/2018 | Zhang | H04L 61/2007 |
| 2019/0028934 A1* | 1/2019 | Rasanen | H04W 36/12 |
| 2019/0159281 A1* | 5/2019 | Amin | H04W 76/40 |
| 2019/0165856 A1 | 5/2019 | Roy et al. | |
| 2019/0199428 A1 | 6/2019 | Regunathan et al. | |

OTHER PUBLICATIONS

Nicolas Jeannin, et al., Smart Gateways Switching Control Algorithms Based on Tropospheric Propagation Forecasts, International Journal of Satellite Communications and Networking, 2019; 37:43-55.

International Search Report and Written Opinion dated Oct. 20, 2020 in corresponding PCT/US2020/047155.

* cited by examiner

| Current State Attributes | | | | | | | | Requested Action and Next State | | | | | | | | | | | | | |
|---|---|---|---|---|---|---|---|---|---|---|---|---|---|---|---|---|---|---|---|---|---|---|
| Curr State ID | Switched In with DGW1? | | | Switched In with DGW2? | | | Request Switch In with DGW1? | | | Request Switch In with DGW2? | | | Request Switch Out with DGW1? | | | Request Switch Out with DGW2? | | |
| | GW 1 | GW 2 | GW 3 | GW 1 | GW 2 | GW 3 | GW 1 | GW 2 | GW 3 | GW 1 | GW 2 | GW 3 | GW 1 | GW 2 | GW 3 | GW 1 | GW 2 | GW 3 |
| 00 | No | No | No | No | No | No | Goto 01 | Goto 02 | Reject DG | Reject DG | Reject DG | Goto 30 | Noop | Noop | Noop | Noop | Noop | Noop |
| 01 | Yes | No | No | No | No | No | Reject Inuse | Reject Inuse | Reject Inuse | Reject Inuse | Noop | Goto 31 | Goto 00 | Noop | Noop | Noop | Noop | Noop |
| 02 | No | Yes | No | No | No | No | Reject Inuse | Reject Inuse | Reject Inuse | Noop | Reject Block | Goto 32 | Noop | Goto 00 | Noop | Noop | Noop | Noop |
| 03 | No | No | Yes | No | No | No | Reject Inuse | Noop | Reject Inuse | Noop | Reject Inuse | Noop | Noop | Noop | Goto 00 | Noop | Noop | Noop |
| 10 | No | No | No | Yes | No | No | Reject DG | Reject DG | Reject DG | Reject Inuse | Reject Inuse | Noop | Noop | Noop | Noop | Goto 00 | Noop | Noop |
| 20 | No | No | No | No | Yes | No | Noop | Reject DG | Reject DG | Reject Inuse | Reject Inuse | Reject Inuse | Noop | Noop | Noop | Noop | Goto 00 | Noop |
| 30 | No | No | No | No | No | Yes | Reject Block | Goto 31 | Goto 32 | Reject Inuse | Noop | Reject Inuse | Noop | Noop | Noop | Noop | Noop | Goto 00 |
| 31 | Yes | No | No | No | No | Yes | Noop | Reject Inuse | Reject Inuse | Reject Inuse | Reject Inuse | Noop | Goto 30 | Noop | Noop | Noop | Noop | Goto 01 |

= Diversity Group 1  Reject DG = Request Rejected since Opposite Diversity Group  Noop = Ignore Request and Same State
= Diversity Group 2  Reject Inuse = Request Rejected since DGW already inuse  Reject Block = Request Rejected since Switches Block it

FIG. 2

GATEWAY DIVERSITY SWITCHING

CROSS-REFERENCE TO RELATED APPLICATION

This application is related to U.S. patent application Ser. No. 16/544,683 entitled "System and Apparatus for Disaster Backup Gateway for a Multi-Gateway Spot Beam Satellite," filed Aug. 19, 2019, having common Applicant/Assignee, the entire content of which is incorporated herein by reference.

BACKGROUND

The present subject matter is in the field of devices, methods, and computer program products for gateway diversity switching.

With the need for higher bandwidth and capacity, satellite systems have evolved starting historically from C-band to Ku-band, and subsequently to Ka-band. Very High Throughput Satellites (VHTS) have further evolved to use Q-band and V-band as well. With these higher frequency bands comes the associated greater susceptibility to deep rain that cause rainfades in these higher frequency bands. Because of the frequency of rainfades, it would be beneficial if the switchover to a diverse Radio Frequency (RF) Gateway were fast enough such that the upper layers of the system, such as bandwidth allocations and TCP do not have to spend time reacting or retransmitting data.

SUMMARY

A method of switching from a first gateway within a plurality of first gateways to a second gateway in a network includes precaching configuration information on the second gateway, that is within the plurality of first gateways, prior to switch-over to the second gateway. The first gateway from which the second gateway is being switched from is identified. The second gateway is configured in accordance with the configuration of the first gateway based at least in part on the precached configuration information prior to the switch-over to the second gateway. Data traffic from data applications using the network is replicated; and, the replicated data traffic is sent to the first gateway and the second gateway. Bandwidth allocated to terminals in the network is frozen in association with the switch-over to the second gateway. The bandwidth allocated to the terminals in the network is unfrozen based at least in part on an indication of completion of the switch-over to the second gateway.

A computer program product for switching from a first gateway of a plurality of first gateways to a second gateway in a network includes a computer readable storage medium having encoded thereon first program instructions executable by a device to cause the device to allocate bandwidth to terminals in the network. Second program instructions are executable by the device to cause the device to freeze the bandwidth allocated to the terminals in the network in association with a switch-over from a first gateway of the plurality of first gateways to the second gateway. Third program instructions are executable by the device to cause the device to unfreeze the bandwidth allocated to the terminals in the network based at least in part on an indication of completion of the switch-over from the first gateway of the plurality of first gateways to the second gateway.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 illustrates a switching state machine table;

DETAILED DESCRIPTION

Figure 1:
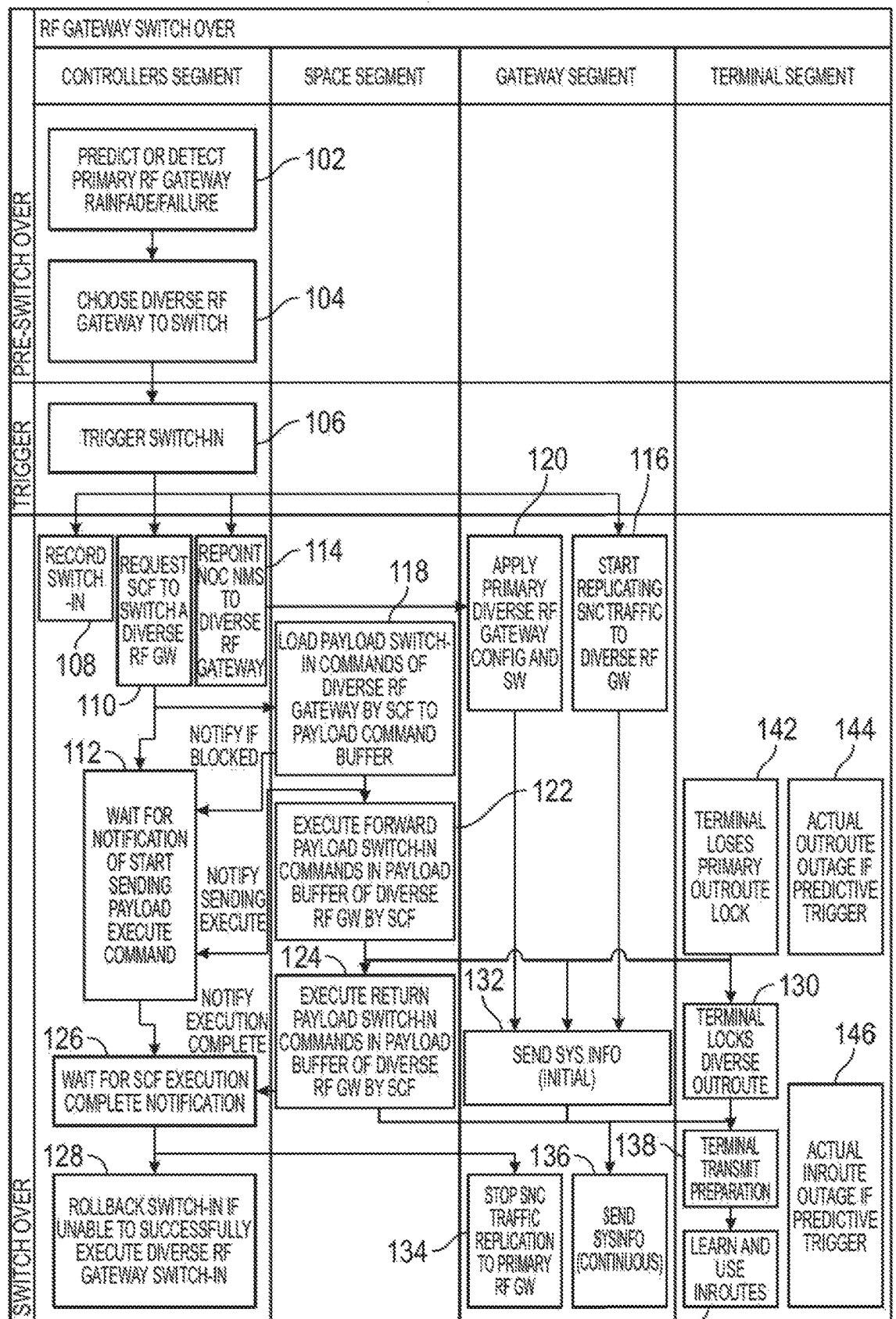
FIG. 1 is a flow diagram illustrating a method of gateway switchover.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following implementations introduce a system that includes geographically diverse and redundant Radio Frequency Gateways (RF Gateways) that can switch-in for primary RF Gateways. The system can enable the switchover from a primary RF Gateway to a diverse RF Gateway as well as switchback to the primary RF Gateway. The use of diverse RF Gateways can occur in VHTS satellite system that utilize Q-band and V-band high frequencies that are susceptible to frequent daily rainfades. A system in accordance with this disclosure can provide switchover to a diverse RF Gateway that can be quick enough that the upper layers of the system such as bandwidth allocations and TCP do not have to spend time reacting to, or retransmitting data. Thus, the systems and methods described herein can reduce and provide minimization of switchover time.

In order to compensate for daily rainfades in higher frequency bands, VHTS satellite systems can adopt a partitioned system such that the traditional Gateway is separated into RF Gateways and Satellite Network Core (SNC) sites. The state of the system at the link and network layers can be contained in a set of SNC locations that may be regionalized, such as located at various datacenters containing Internet Protocol Gateways (IPGWs), Inroute Group Managers (IGMs), and Satellite Gateways (SGWs). The remaining transmission layer can be located at the RF Gateway locations, which can contain the modems including the Outroute Modulator Module (OMM) and Inroute Demodulator Module (IDM) along with the Radio Frequency Terminal (RFT) and its RFT antenna. The RF Gateways can be geographically separated to minimize interference between the RF Gateways. The SNC sites may be located at sites that are geographically located to balance the distances between the RF Gateway locations and their public Internet connections.

Each RF Gateway can be switchable in functional state between different "diversity state values." One of the diversity state values will be referenced, for purposes of description, as "switched-in," and, as used herein, the term "switched-in" includes the diversity state value of one RF Gateway where it is the acting and switched-in RF Gateway for end-user traffic. This may be a diverse RF Gateway switched-in for a primary RF Gateway, such as due to a rainfade at the primary RF Gateway or a primary RF Gateway switched-in for itself. As used herein, the term "switched-out" includes the diversity state value of one RF Gateway where it is not the acting RF Gateway and another RF Gateway is switched-in for end-user traffic. This may be a diverse RF Gateway switched-out and idle waiting to be switched-in for a primary RF Gateway or a primary RF Gateway switched-out and a diverse RF Gateway is acting on its behalf. As used herein, the term "switching-back" includes the process of a primary RF Gateway switching-in for itself to become the switched-in RF Gateway. As used herein, the term "switching-in" includes the transition phase of switching between one RF Gateway to another RF Gateway. This can involve a primary RF Gateway and a diverse RF Gateway. The diverse RF Gateway may be switching-in for the primary RF to become the switched-in RF Gateway or it may be a primary RF Gateway that is switching back in for itself. As used herein, the term "switchover" includes the process or act of switching-In. As used herein, the term "standby" includes the process where a diverse or primary RF Gateway is switched-out and includes continuing to transmit if possible in preparation for switching-in when needed.

The can be many different scenarios of outage or failure that can trigger an entire primary RF Gateway switch to a diverse RF Gateway, and examples may include, but are not limited to, rainfade outage at the primary RF Gateway site, temporary power outage at the primary RF Gateway site, and temporary outage at the primary RF Gateway site that incapacitates the primary RF Gateway site. Other scenarios can include, without limitation, temporary Internet Service Provider (ISP) link outage or severe degradation at the primary RF Gateway Site under the assumption that there is not ISP link redundancy for user data. In addition, there can be temporary failure of components that impacts a large percentage or all of the primary RF Gateway Site service capacity (e.g., outage of RFT), and/or brief switchovers due to maintenance of a primary RF Gateway that would have caused an outage. This list of scenarios can be for temporary or brief outages. The primary RF Gateways can share the same diverse RF Gateways; and as such, use of this shared resource may be arbitrated.

A switchover from the primary RF Gateway to a diverse RF Gateway may or may not be partial. For example, in an implementation, all beams and all users serviced out of a given primary RF Gateway can be moved to the diverse RF Gateway that is switching in for it. Thus, the switchover may be all or nothing. Other implementations may include partial switching of an RF Gateway, such that only a subset of user beams, for example, only those detected to be actually experiencing rainfade degradation, can be switched instead of switching all user beams. Also, in one or more implementations, a different subset of user beams of the primary RF Gateway in rainfade may be switched to different diverse RF Gateways at the same or different times depending upon their rainfade degradation. The different switching of different subsets can depend, for example, at least in part, upon switching capabilities and granularity of the VHTS satellites.

Optionally, for long-term failures of a primary RF Gateway or a diverse RF Gateway, the Disaster Recovery GW (DRG) (aka "transportable GW") may be utilized instead of a regular diverse RF Gateway. A DRG can be switched-in for a primary RF Gateway or a diverse RF Gateway in the event of their long-term failure. The various types of redundant GWs can be differentiated by the use cases when they are utilized, such as during short-term rainfades or long-term GW failures, and the speed of the switchover time, such as in seconds or hours.

System implementations can make a number of assumptions, including, for example, an average number of switches per primary GW per day with wide variance due to seasonal trends such as rainy seasons with a given number of switch-ins per RF Gateway per day worst-case. One non-limiting example of an average number of switches per day can be 3 to 4. On non-limiting example of a worst number of switch-ins per RF Gateway can be approximately 100. Additional assumptions can include, for example, diverse RF Gateways acting as redundant GWs, and/or only diverse RF Gateways can spare for primary RF Gateways. Other assumptions can include each diverse RF Gateway's resources (i.e., size, capacity, hardware components, etc.) being equal to each of the primary RF Gateway's resources that it may switch in for. Another can be each primary RF Gateway being optimized for one of the diverse RF Gateways for better transmission path performance in the payload even though either diverse RF Gateway can usually be utilized if needed for any primary RF Gateway (i.e., Western diverse RF Gateway favored for Western primary RF Gateways), and/or a primary RF gateway cannot switch-in for another primary RF gateway. Additional assumptions can include each diverse RF Gateway's equipment being powered up and in standby state so that it is already at operating temperature whenever it is needed to be switched-in. Other assumptions can include the RF Gateway diversity controller requiring remote access and monitoring from its SNC deployment location to the candidate diverse RF Gateways and the SNC of the switching RF Gateways during any switching transition, including to switch-in and to switch-out, as well as while switching-in, and while switching-out. A related assumption can be the servers at the Network Operations Center (NOC) not being directly involved in diversity switchover so Network Management System (NMS) servers are not required to be always up or highly available.

In an aspect, one or more of the diverse RF Gateways can be configured to maintain outroute carriers transmitting to the satellite even if the outroutes are not sending end-user data even while the diverse RF Gateway is in standby and switched-out mode. This can keep a relatively constant power being transmitted to the payload by the RF Gateways during switch-over. In contrast, if power levels from the diverse RF Gateway varied enough while moving the switches on the payload, it may cause spikes and potential harm for payload components. The RFT Uplink Power Control (ULPC) for a switched-out RF Gateway can continue to perform uplink power control based upon its beacon.

For transmission reasons, it may sometimes or in some circumstances be undesirable to send non-random data and uniform MODCODs from diverse RF Gateways or redundant RFTs while switched-out. In one implementation, a dedicated traffic generator at each diverse RF Gateway can generate random codeblocks and random MODCODs while the diverse RF Gateway is switched-out. This can offload the generation from the OMM but keep the generator within an RF Gateway.

One or more, or all of the diverse RF Gateways can be managed by the NMS and SNCs even while they are switched-out. The management can include, for example, monitoring of RF Gateway components for faults. The configuration of the diverse RF Gateways provided by the NMS can be a special standby and switched-out configuration of the RF Gateway components. When a diverse RF Gateway is switched-in for a primary RF Gateway, it can adopt the primary RF Gateway's configuration from the NMS overriding the diverse RF Gateway's switched-out configuration. One or more of, or all of the primary RF Gateway's configuration can be pre-staged at each of the diverse RF Gateways. Benefits can include, but are not limit to, the NMS not having to be involved in the actual switch-over steps.

The NMS can utilize a reliable two-phased commit approach to distribution of primary configuration to both the given primary RF Gateway and the diverse RF Gateways. In at least one implementation, this two-phased commit approach can utilize a copying and temporarily staging of the primary RF Gateway configuration changes at all destination locations and after successful staging at all locations then initiating of the committed update at all locations. The time necessary to commit updates can be small and thus less vulnerable to interrupt or failures. In addition, if there is a failure, the NMS can attempt to rollback the staged change and the committed operations on all destinations. This feature can enable and can assist in ensuring that all of the diverse RF Gateways have the primary RF Gateway configuration at the same time as the primary RF Gateway thereby providing consistency. If one or more of the diverse RF Gateways are unreachable by the NMS, primary RF Gateway updates may be delayed until such diverse RF Gateways can be reached by the NMS. For example, an operator can manually specify that a diverse RF Gateway is switched-out, e.g., due to a maintenance window, or that a switched-out primary RF Gateway is out of service, for example, due to a RF Gateway failure, and that the RF Gateway is not available for switch-in so that it does not block the two-phased commit from completing.

In an implementation, a separate local RFT Monitor and Control Subsystem (M&C) server software and configuration can be provided for each diverse RF Gateway. Each of these RFT M&C can feed into the same aggregate RFT M&C located at the NOC as used by the other RF Gateways. Each diverse RF Gateway may get its own separate unique RF Gateway ID to use that is also separate from any primary RF Gateway ID. When a diverse RF Gateway is switched-in for a primary RF Gateway, RFT M&C messages and data sent by the diverse RF Gateway can utilize this separate RF Gateway ID. In at least one implementation, the statistical correlation between simultaneous rain at both of the diverse RF Gateways and each of the primary RF Gateways is expected to be very low due to their large geographic separations. Monitoring of the diverse RF Gateway can be provided by the aggregate M&C at the NOC, and this in turn can be provided to EM7 as the higher-level manager of the entire satellite network.

In at least one implementation, the terminal diagnostic and history tracking tools can be used to separate data collected for diverse RF Gateways from the primary RF Gateways that they switch-in for. The performance while using a diverse RF Gateway may generally be different than the performance when operating with the primary RF Gateway. It may be preferred that different performance does not pollute the data analysis performed by these tools, as the analysis' compensation for events like rainfades can utilize comparing terminal installs against other similar installs in the same geographic area within the user beam the previous day and the same day. The diverse RF Gateway communication on the payload can go via additional on-board payload communication path switches which may also degrade the performance somewhat compared to the primary RF communication paths in the payload when both are in clearsky. This compensation can be done by filtering for the active RF Gateway ID when it matches one of the diverse RF Gateway's separate unique IDs and does not match the primary RF Gateway ID in statistics data and terminal info. During switch-over events and while a diverse RF Gateway is switched-in, on-site terminal installation verification can issue provisional installation approvals as needed until the diverse RF Gateway is switched-out so that on-site terminal installation verification can be re-run using the primary RF Gateway.

The following actions may occur once a switchover is issued and triggered automatically due to predicted rainfade or actual rainfade or as commanded by operations. In at least one implementation, the switchover operation can be considered an atomic operation, in that it may be non-interruptible or substantially non-interruptible by an operator, and it either succeeds completely, or attempts to roll back to a previously known good state. A sequencing of these actions, in at least one implementation, is illustrated in FIG. 1. Many steps may occur in parallel. Switching back may be done via the same sequence but from the diverse RF Gateway to the primary RF Gateway.

In at least one embodiment, a system core includes a set of segments used to transport bits over the satellite along with the segments required to manage and control these transport segments. The system core can logically include a space segment, a terminal segment, a gateway segment, and a network control segment. The space segment can include the satellite and components required to fly and manage the satellite. A Satellite Control Facility (SCF) can be the control center for satellite station keeping, payload monitor and control, and satellite bus monitoring and control.

The terminal segment can include indoor units, outdoor units, and antennas required to access the satellite from a remote location. The gateway segment can include antennas, RFTs, and components required to interact with terminals over the satellite providing them with connectivity to the LAN/WAN. Components and subsystems of the gateway segment can be deployed at the Radio Frequency Gateway (RF GW) and the SNC. The RF GW can include the antennas, RFTs, and transmission layer Gateway components that connect to the satellite. The SNC can include the link layer, network layer, and management layers of the Gateway segment connected to RF Gateways via a private backhaul network provided by the LAN/WAN segment and connected to the Internet also (e.g., via the LAN/WAN segment).

The network control segment (NCS) can include the controllers of the network, gateway segment, and satellite payload (e.g., via the Space Segment SCFs TT&C link) such as the diversity RF GW controller, which may be collocated with a SNC site when deployed. The LAN/WAN segment can include networking components used to interconnect Gateway components, provide access to the Internet, provide connectivity via the private backhaul network between RF Gateways and SNCs, and provide remote access for management systems. The management segment can include a set of central and distributed components used to manage terminal, controllers, and gateway segment components.

The following describes steps that can be performed before actual switchover occurs. Since rainfade may be frequent and the outage time should be minimized, the decision to perform a switchover may be performed using one among a plurality of means or configurations, such as the following examples. In one configuration the RF Gateway diversity switchover controller can be logically part of the network controller segment and its functionality can include being the responsible entity that choreographs the switchover steps and orders RF Gateway switchover requests. Functionality can include being the responsible entity that makes the determination that a rainfade has occurred, and makes the choice of the RF Gateway to switch in. The RF Gateway diversity switchover controller can have connectivity for programmatic interfaces with the Space Segment's Satellite Control Facility (SCF) for requesting commanding of the payload to perform its switchover in order to reduce delay due to rainfade. The RF Gateway diversity switchover controller may be configured to be operable as a controller pair, with one of the pair acting as the primary controller and one acting as the standby redundant manner controller. Each controller (e.g., primary manner controller, standby redundant manner controller) can run at geographically separated SNC site locations running on SNC compute servers. The SNC site locations may be planned to initially be coincident with Telemetry, Tracking, and Command (TT&C) cities, to assist in minimizing communication delay. The RF Gateway diversity switchover controller and the TT&C can be configured to switch independently. Minimization of delay between them may only be done at design time when deciding where to deploy them, not during redundancy switches. The communication can go via secure encrypted VPN links between all pairs of sites.

Back-to-back diverse RF Gateway switches may have to wait for the telemetry-based acknowledgment notifications of command completions from SCF before sending a next switching diversity request for either the same or another diverse RF Gateway. Telemetry verification by the SCF may not be included in the interface. In order to reduce delay due to rainfade, the RF Gateway diversity switchover controller can be configured to verify if its requested actions have taken effect. Such a configuration can include the RF Gateway diversity switchover controller waiting for the previous request's sequence of commands to be fully executed before sending the next request and its sequence of commands. If a sequence of commands is interrupted with a second sequence, then the second sequence of commands may abort the first sequence of commands.

The RF Gateway diversity switchover controller can be configured such that if a higher priority command needs to be issued on the payload, the switch request and its sequence of commands may be paused until completion of the higher priority commands. The switch request can resume after the interruption, but this may delay the total duration of the gateway diversity switch. The SCF can be configured to automatically cancel any switch requests that need to be paused, e.g., by higher priority SCF commands to the payload by pausing for more than the SCF configurable parameter such as in units of seconds.

A running average of the daily maximum clearsky value experienced by each RF Gateway can be based upon the beacon power level of the beacon receiver in the RFT. The clearsky can be expected to change seasonally and potentially degrade over the system lifetime and thus may need to be a running average of set time period (e.g., 30 days). The beacon receiver may be received by the RF Gateway downlink on a Q-band frequency even though outroutes may be transmitted on Ka-band and V-band for VHTS satellites based upon the RF Gateway frequency plan. The return downlink path for the RF Gateway can be monitored for an outage using the beacon because of the higher frequencies used at the RF Gateway and the ability to switch to the diverse RF Gateway. The link availability of the user beam's downlink forward and uplink return path may or may not be considered in the switch in of the diverse RF Gateway. The clearsky value from the beacon may vary by one or more decibel (dB) each season with the peak during winter.

The initial clearsky threshold can be manually configured at the time of each RF Gateway installation. The over-the-air testing of each RF Gateway can take a significant time period (e.g., at least 30 days) before initial service launch. The average clearsky threshold can be initially learned and calculated based upon the beacon values collected over this period. The threshold for declaring a rainfade outroute can be based upon the drop-in link margin of clearsky capacity at time of switchover. For VHTS, that degradation can translate into a drop (e.g., one or more decibel-milliwatts (dBm)) of the Q-Band power levels of the beacon receiver below its clearsky value.

For beacon tracking, only a Q-band beacon on the GW return downlink may be supported. The beacon may always transmit to RF Gateways by the payload, including to the diverse RF Gateway when it is switched-out. This can allow detection of rainfade at the diverse RF Gateway before attempting to switch it in for a primary RF Gateway or when switching back to a primary RF Gateway. These variations may be considered when using historical beacon data by normalizing values across RFT relative to max clearsky such as before training a prediction model on this historical data.

There may be several parameters provided by the RFT from different devices and device types within the RFT for monitoring the downlink beacon signal's power from the payload. As such, there may be a design trade to determine which measurement device in the RFT and which measurement parameter(s) to utilize for monitoring and detecting rainfades reliably.

Instead of or in addition to rainfade beacon tracking, the SNC can be configured to monitor degradation of system performance to determine when to trigger a diversity RF Gateway switch-in. The monitoring can track the utilization from the Outroute Bandwidth Manager (BWM) for the outroute, such as using non-real-time capacity, and Inroute Bandwidth Manager (IBM) for the inroute to determine when one or more user beams of a RF Gateway are suffering from degraded performance. This "goodput" metric of utilization, such as using BWM's non-real-time computations of backlog requests versus actual allocations, can stand in as a proxy for rainfade detection. In at least one implementation, since the metric is at the granularity of each user beam, more complex weighted rules can be utilized, such as if a percentage of user beams are degraded instead of the rainfade beacon, which is calculated for the worst-case user beam of a given RF Gateway in the link budget.

Instead of or in addition to other techniques like rainfade beacon tracking, the SNC can be configured to monitor degradation of system performance to determine when to trigger diversity RF Gateway switch-in. This can track MODCODs for receive and transmit for clearksy against rainfade to determine when one or more user beams of a RF Gateway are suffering from degraded MODCOD performance.

In an implementation, operations can be applied to predict an imminent rainfade in the near term, and such prediction can be applied to preemptively switch to the diverse RF Gateway before rainfade degradation starts and with enough time to perform the switchover before the expected rainfade is experienced. Slant angle from a radar weather feed can utilize a radar weather feed updated every couple of minutes for Gateways to predict rainfade. This can rely upon a slant-angle algorithm given latitude and longitude of the Gateway RFT to predict if the RF Gateway antenna may experience a rainfade when a rain cloud blocks its line of sight of the satellite payload.

The system can also predict rainfade from RFT beacon power level patterns using RFT power levels reported (e.g., every few seconds) from a pair of beacon receivers at each RF Gateway. Machine learning supervisory learning can use historical data to learn patterns of rainfades based upon the rainfade threshold and make short term (e.g., several seconds) predictions. There can also be a minimum rainfade duration time (e.g., several seconds) of a contiguous duration to consider it a rainfade within the short-term prediction time.

Rainfade prediction from a radar weather feed can utilize a radar weather feed updated (e.g., every couple of minutes) for Gateways to predict rainfade. Machine learning supervisory learning can use historical data of rain density measured by radar to learn patterns of rainfades based upon the rainfade threshold and make short term predictions whenever the radar data is updated. This can be utilized to determine when the diverse RF Gateway should switchout for a primary RF with the prediction that there will not be rainfade for the given primary RF Gateway for the next several minutes, for example.

The system can include a separate model trained to predict which primary RF Gateway will likely be the next one to switch in, but it may not be as accurate as the short term model run for each individual RF Gateway and may use a much larger model to look at all of the primary RF Gateway's beacon values at the same time. This model can be trained to predict further out from short durations to longer durations. There may also be a minimum rainfade duration time of a contiguous duration. This model may have a slightly larger error and may be more pessimistic (i.e., assume the worst scenario). This prediction can be used to signal a diverse RF Gateway which primary RF Gateway it should be primed to switch-in for.

The system can rely on a randomly selected set of terminals that reside in the same coverage area as the RF Gateway. These terminals can be used to monitor the Signal-to-Noise Ratio (SNR) of their outroute in order to track rainfade over the given terminals and to report their SNR values to the RF Gateway diversity controller. The RF Gateway diversity controller can use the terminal supplied data to predict movement of weather, and thus can predict rainfade in the time range of minutes ahead of time relative to the RF Gateway beacon value as ground truth using machine learning prediction. The population of terminals may need to be large enough to avoid rogue or mis-pointed terminals and to ensure enough coverage of different directions from the RF Gateway antenna to detect storm clouds moving in different relative directions towards the RF Gateway. This prediction can be used for determining when a diverse RF Gateway should be switched-out for a primary RF Gateway because another primary RF Gateway is anticipated to need to be switched-in within a few minutes.

The system can react to rainfade degradation if the threshold for the RFT beacon receiver's power levels drops sufficiently that it signals a degradation of the link margin of the primary RF Gateway. This can assume that the link margin is already degraded by the time that this threshold crossing is detected but has not necessarily experienced a complete outage.

The system can also react to a rainfade outage to catch any missed detections and to prevent complete outages due to rainfades. If the threshold for the RFT beacon receiver's power levels drops sufficiently, this can signal a complete outage of the link of the primary RF Gateway. This can assume that the link margin is already exhausted by the time this power value is detected and has experienced a complete outage. This may happen before the system is able to react to a more gradual rainfade degradation or as a result of a false-negative prediction of the rainfade that incorrectly predicted clearsky when it is rainfade that is actually experienced. Since predictions and degradations may not catch all rainfade outages before they happen, the system's reaction to a complete outroute can be utilized as a backstop to other techniques.

Additionally, the system can include an override option by an authorized operator to force a switch-over or switch-back as desired. An override may be the result of non-rainfade reasons to switch or for testing or exercising switch-over mechanisms. The RF Gateway diversity switchover controller can make the determination that rainfade has ended sufficiently in the past that it is unlikely to repeat. A high-water mark threshold for a clearsky power level relative to the rainfade threshold can be utilized to prevent oscillating between rainfade and clearsky. Once it is predicted, detected, or commanded that the restored clearsky threshold has been crossed for a sufficient duration or value samples at the primary RF Gateway, the diverse RF Gateway can switch back to the primary RF Gateway.

The system can identify the diverse RF Gateway that will be used to switch over. A greedy approach can be utilized where a primary RF Gateway is switch-out to its favored diverse RF Gateway if the diverse RF Gateway is not currently switched-in for another primary RF Gateway. In at least one implementation, each RF Gateway resides in a favored diversity group, such as dividing the RF Gateways between a western set of RF Gateways and an eastern set of RF Gateways. The system may attempt to choose the diverse RF Gateway in the same favored diversity group first before attempting to use another diverse RF Gateway in the other favored diversity group.

A first-come first-served approach can be used by the system, where diverse RF Gateways are assigned based upon the order of requests for a diversity switch-in. The selected diverse RF Gateway can be requested to be the diverse RF Gateway in the same favored diverse RF Gateway group as the primary RF Gateway. Once a diverse RF Gateway is switched-in for a primary RF Gateway, it may not be relinquished until the rainfade ends and the primary RF Gateway is switched back in.

In case of simultaneous rainfades in multiple primary RF Gateways, instead of serving the primary RF Gateways on a first-come first-served basis, the primary RF Gateways can be ranked based upon the importance of the user beams that they serve. If a primary RF Gateway needs to switch-out due to rainfade, but all of the diverse RF Gateways are currently switched-in for a lower priority primary RF Gateway, then the lowest priority primary RF Gateway that has Diverse RF GW switched-in for it can be switched-back for the highest priority primary RF Gateway needing to switch to one of the diverse RF Gateways. Severity of the rainfade outage may also be utilized as a factor in the priority of the primary RF Gateway requesting a switch-in.

The diverse RF Gateway can be switched-out to a standby state before it is requested to be switched-in for another primary RF Gateway. The diverse RF Gateway may not be switched directly from one primary RF Gateway to another RF Gateway in order to minimize the number of scripts needed to be pre-generated on the payload to support all of these possible combinations. SCF script permutations can require that the SCF interface supports with its permutations of scripts to switch from any primary to any other primary RF Gateway directly in one step instead of switching out the diverse RF Gateway as an intermediate step.

Implementations of systems according to this disclosure can be configured to avoid switchbacks to a primary RF Gateway unless another primary RF Gateway needs the diverse RF Gateway. This feature can help with availability since it can avoid unnecessary switching back and forth of the same primary RF Gateway that causes outages on each switch. For example, if the same primary RF Gateway experiences multiple rainfade events spread out over a long duration, then this could attempt to stay with the same primary RF Gateway switched-out the entire time instead.

The space segment SCF may respond to a request for a switchover with a denial. This may be the result of a higher priority operation being executed by the SCF on the payload or other factors. Several types of payload commands from the SCF (e.g., satellite orbital maneuvers, satellite failure recovery, satellite position ranging) can have higher priority than a diversity switching command and can thus block or delay the request. The SCF response for a denial of switch can provide an SCF suggested time duration for the RF Gateway diversity controller to wait before retrying a switch request for transient denial of switch. The SCF may detect a failure that requires SCF operator intervention and may respond with a denial of switch with an indefinite time-to-retry. The RF Gateway diversity controller can be forced by an NMS operator to enter a paused state blocking any subsequent switch requests until it is unblocked by the NMS operator. The RF Gateway diversity controller can continue to make diversity switch requests when a rainfade is subsequently detected after waiting for the duration specified in its last non-indefinite time-to-retry response and can observe if it is not blocked from making switch requests based upon an NMS operator forcing a pause.

The space segment payload can be configured to utilize a hierarchy of switches to switch-in each of the diverse RF Gateways for each of the primary RF Gateways. The payload switches can be designed to only allow certain combinations of switches and thus some combinations can be blocked and not allowed due to the switch hierarchy design. For example, a primary RF Gateway can be manually switched-into the diverse RF Gateway that is not within its diversity group, then that will potentially block another primary RF Gateway from being switched-into another diverse RF Gateway. The RF Gateway diversity controller can be configured to model these blocking constraints as a state machine. Each state can be defined by the currently switched-in diversity RF Gateways for the current primary RF Gateways; and, the transition from that state to another state can be constrained by the allowed switching actions as specified by the payload design. For example, a state can be defined with a diverse RF Gateway DGW2 in diversity group #2 which is the Eastern diversity group being already switched-in for a primary RF Gateway of GW1 which is in the diversity group #1 and a diverse RF Gateway DGW1 is switched-out and in standby-state. The allowed actions from this current state can be limited by the payload switch design and hierarchy if another primary RF Gateway from diversity group #2, such as a primary RF Gateway GW3 could have the DGW1 diverse RF Gateway be able to switch-in for it. If that action is allowed, the state machine can transition to this new state, but if it is not allowed by the payload design, the state machine self-referencing action can return to the current state with a rejection of the switch-request by GW3. The state machine can be maintained by the RF Gateway diversity controller and can prevent blocked requests from being sent to the SCF or payload. An example of a state machine table for diversity switching can be found in the table illustrated in FIG. 2. The table does not show variations of the state machine when operator overrides are involved for ease of presentation.

The primary RF Gateway can be configured to adapt to various denials of request. On such configuration can adapt to a scenario such all diverse RF Gateways being switched-in for other primary RF Gateways when an additional primary RF Gateway requests to switch-in a diverse RF Gateway or when the SCF denies the switch request. The configuration can include the primary RF Gateway maintaining or resuming operation using its configuration before the denial of the request. Furthermore, the primary RF Gateway can be configured to adjust its resources for better robustness of link, outroute Msps, and MODCODs in order to better ride through the rainfade. If there is contention for the use of diverse RF Gateways and a primary RF Gateway is already switched-out to a particular diverse RF Gateway, the diverse RF Gateway already switched-in for the primary RF Gateway can remain with that diverse RF Gateway if the given switched-in for primary RF GW continues to experience rainfade.

As part of the RF Gateway diversity controller selection of which primary RF Gateway needs to be switched-out, the RF Gateway diversity controller can be configured to select which diverse RF Gateway should be used to switch-in. The configuration can include weighing or considering that a diverse RF Gateway may not be available for selection due one or more of a plurality of reasons. Such reasons can include, but are not limited to: failed status, out of service state, in rainfade, and diverse RF Gateway active viability testing failure. More specifically, an individual diverse RF Gateway operational status may be out of service, which may disqualify it for consideration. This operational status may be due to an aggregated failure status of critical components such as baseband equipment failures like modems or RFT equipment failures and transmission paths or active critical alarms at the diverse RF Gateway. Moreover, the operator may have manually put the diverse RF Gateway into an out of service state which may disqualify it for consideration such as due to maintenance at the diverse RF Gateway.

The diverse RF Gateway's beacon can be configured to transmit from the satellite to the diverse RF Gateway even if it is switched-out. If the short term rainfade prediction for the diverse RF Gateway predicts that the diverse RF Gateway is in rainfade or the beacon power level says that it is already in rainfade, the diverse RF Gateway may be disqualified from consideration to be used to switch-in for a primary RF Gateway.

The test terminals residing in the RF Gateway can be used for active transmitting from the RF Gateway in a loop back to the RF Gateway inroute modems and then forwarded via a virtual private network (VPN) to the test terminals. The multiple test terminals can generate alarms and if a quorum of terminals report alarms, then that can be used in determining the aggregate failure status of the RF Gateway. These may potentially disqualify the diverse RF Gateway from being considered for diversity switch-in if there is a majority of OSTB test terminals reporting failure alarms.

In at least one implementation, an external RF Gateway diversity controller can be used that invokes application program interfaces (APIs) to trigger a diversity switch. The external RF Gateway diversity controller can access APIs to collect near-real time statistic feeds and state information in support of decision making such as rainfade beacon telemetry, RF Gateway current switch states, and/or payload diversity switch state. The API can be invoked from external entities deployed either at the SNC or RF Gateways or NOC.

Once the RF Gateway is selected for switch-in, the system can automatically trigger and notify this decision and action that initiates the switch over steps. In at least one implementation, no human is required to trigger a switch-in due to the switchover times required in seconds to complete in order to address rapid rainfades on a daily basis per RF Gateway.

Referring back to FIG. 1, the flow diagram illustrates a method of gateway switchover showing dependencies between method steps. In an aspect, once the switchover is triggered, the steps illustrated in FIG. 1 can occur either sequentially or concurrently. Also, the steps can be performed by a controller segment, a space segment, a gateway segment, and a terminal segment. In an implementation, the controller segment cab be configured such that, prior to triggering switch-in 106, it can predict or detect primary RF Gateway rainfade/failure 102 and choose a diverse RF gateway to switch 104.

The RF Gateway diversity switchover controller can be configured such that, after trigger switch-in 106, the controller can record and log the switch-over decision for historical reasons 108. The RF Gateway diversity switchover controller can also be configured to send the request to the SCF to perform the RF Gateway switch-in via its programmatic API 110. This step can proceed in parallel with subsequent steps. As a result of step 110, the SCF can respond with a notification that may also indicate that it is blocked from performing the requested switch ("Notify If Blocked" arrow). The notification can be sent immediately (synchronously), or as shown in FIG. 1, the requester may asynchronously wait for the notification 112.

The diversity switchover controller can be configured to repoint the NOC NMS to the diverse RF Gateway 114. The repoint can be a best effort attempt to repoint the NMS since the NMS may not be highly available and may not be operational during a switch-over attempt. This can include not attempting retries in repointing the NMS for a single switch-over if the NMS is not available or responsive during that switch-over transition. If the NMS is not able to be repointed, it may remain mispointed until the next diversity switch-in or switch-out when it will be attempted to be repointed again.

In order to repoint the links and communication between the NOC NMS and the RF Gateway's NMS components, both ends of the communication may be updated to switch-in the diverse NMS components for the primary GW NMS components. This repointing can be performed, for example, based upon the RF Gateway diverse controller automatically commanding the NMS to perform the repointing by updating of the NMS files that specify the end points and restarting the NMS processes as needed.

In an implementation, primary RF Gateway NMS Servers that push data to the NOC NMS can be paused to avoid the situation where they are trying to push management data up to the NMS servers at the NOC. This can be a best effort attempt to pause the RF Gateway NMS servers at the primary RF Gateway since these NMS servers may not be highly available.

The Software Defined Networking (SDN) network controller responsible for controlling the backhaul network can update the segment routing list on the NOC NMS and the diverse RF Gateways to route to each other via the backhaul network. This can be a best effort attempt to update segment routing at the NOC since the NMS servers at the NOC may not be highly available. The SDN controller, based upon commands from the RF Gateway diversity controller, can update the segment routing lists at the SNC(s) for the primary RF Gateway's user beams in order to add segment lists of the diverse RF Gateway for data traffic for those user beams in addition to the primary RF Gateway.

The gateway segment can start replicating SNC traffic to the diverse RF Gateway 116. The SNC data applications can replicate their data traffic to both the primary RF Gateway and the selected diverse RF Gateway during the switchover transition. The SNC data applications can utilize the updated segment routing lists to send to both RF Gateways. Both the forward and return communication paths may be enabled on the wide-area network (WAN) by the SDN controller between the SNC and its primary and diverse RF Gateway during switch-over. For the return path, only the communication path that is currently active in the payload may be able to send return communications that are subsequently forwarded to the SNC.

There may be a small chance that out of order IP packets containing codeblocks are received by the IGM at the SNC due to delay variations over the backhaul WAN between the two RF Gateways to their SNC. This may be unlikely when switching from the primary RF Gateway to the diverse RF Gateway since the primary RF Gateway may be closer and have lower delay than the diverse RF Gateway. There may be a slightly more likely chance when switching from the diverse RF Gateway back to the primary RF Gateway since the diverse RF Gateway may receive inroute transmissions from terminals just before the payload switches and the primary RF Gateway may be able to quickly receive transmissions from terminals. This condition may not be expected since there may be sufficient delay before the outroute is locked from the primary RF Gateway by terminals until the inroute is able to be transmitted on for the primary RF Gateway by terminals. The GM can be free to discard or forward these out of order packets.

A Bandwidth Allocation Packet (BAP) is a system information message sent by the Gateway to terminals to inform the terminals of bandwidth reserved for an individual terminal's transmissions. From the start of initiation of switch over when replication is started to send packets to both RF Gateways, the BAPs can be marked as "frozen" via a field within the BAPs and unchanged until after the switch-over re-establishes and completes (i.e., when replication is stopped). New bandwidth allocation requests and updates to backlog can be ignored by the IGM during this frozen period. The BAP can include an explicit signal of in-progress RF Gateway switchover as specified in the Super Frame Numbering Packet (SFNP) as an optional field that tells the terminals when to start using the frozen allocation BAPs. The BAP can include an explicit signal of finished/completed (successful or rolled back) RF Gateway switch-over as specified in the SFNP as an optional field that tells the terminals when to stop using the frozen allocation BAPs.

In at least one implementation, the RF Gateway diversity controller determines if the satellite payload has initiated switch-over, when it is in the middle of a switch-over and determines if the payload has successfully completed the requested switch-over based upon updates from the SCF. An NMS-configurable delay can be added to this final successful payload switch completion determination to account for expected delays in terminals acquiring outroutes and inroutes before normal operations can commence. A denial of request or switching failure on the payload detected by the SCF may also lead to a premature end-of-switch-over determination and a possible rollback attempt.

Switch-over state transitions can be explicitly signaled to the SNC and RF Gateways by the RF Gateway diversity controller upon triggering switch-over initiation and again after completion of the end of switch-over determination. The RF Gateway diversity controller can signal the SNC's components including the Satellite Gateway and IGM as well has signaling updates of the system information messages (i.e., SFNP and BAP) that are sent to terminals that signify the current switch-in state, including if a switch-over is in progress or completed or rolled back. Depending upon the outage duration, the system can prioritize traffic class of service such as CBR to ride out the outage and not try to carry forward interactive traffic over the longer outage In addition, the system can over-allocate bandwidth allocations as part of the frozen BAPs. For terminals that may be vulnerable to going idle due to the last BAP allocations that are to be frozen, additional allocations can be provided to those terminals during the frozen BAPs if capacity is available. For terminals performing video streaming, additional allocations can be provided to pad their current reservations to avoid hiccups or buffering due to service interruptions, but only if the extra capacity is available.

During the switchover period as a part of this step, A-SCMA/SCMA group bursts may not be utilized to avoid complexity during reassembly, such as due to out of order codeblocks as declared in the system information. During the switch-over, no inroute or outroute configuration may be changing. Thus, the Outroute Stream Definition Packet (OSDP), Inroute Group Definition Packet (IGDP), etc. may have the same values regardless of whether the primary or its selected diverse RF Gateway is being used. This lock out may not apply to operators making changes to configuration within the NMS. The NMS can pause application of any configuration changes by the given RF Gateway during a switch-over. The OSDP can include system information transmitted by the Gateway to terminals in a user beam to inform the terminals of the current configuration of all forward outroute carriers including their center frequency and symbol rate in their user beam. The IGDP can include system information message transmitted by the Gateway to terminals in a user beam to inform the terminals of the current configuration of all inroute channels and groupings of inroute channels of the same symbol rate for terminal return inroute transmissions.

Active Terminals can remain active during the switchover as long as they hear the expected system info messages. Inactive terminals may not go active during switchover even though they can still use A-SCMA/SCMA/Aloha. This can avoid the IGM having to queue inactive terminals waiting to go active. This can be communicated to terminals via system information messages During switchover, terminals may be inhibited from performing outroute move evaluations as communicated to terminals via system information messages. If the terminal is already initiating an outroute move (either self-initiated or network-initiated), the terminal can abort the outroute move and try to return its original outroute to recover. The terminal can ignore network initiated outroute moves commanded by the IPGW.

The primary RF Gateway's RFT and the diverse RF Gateway's RFT can be both enabled and transmitting to the given payload in anticipation of the payload switchover. The diverse RF Gateways can generally always be transmitting even if they are not switched-in so that the power being radiated to the payload can be constant even during switchovers. If the SNC is not transmitting codeblocks to its active RF Gateway, the RF Gateway, such as the diverse RF Gateway, can continue to put up outroute carriers with codeblocks on the frequencies as specified by the diverse RF Gateway's switched-out configuration. The RFT ULPC can continue to operate for a switched-out RF Gateway.

The space segment can load payload switch-in commands 118. It may be assumed that all supported transitions from any primary RF Gateway to either diverse RF Gateway is preloaded on the payload as scripts that are selected and executed as needed upon switchover. The satellite payload operator can generate all satellite scripts for diversity switching, including Diversity GW 1 backing up Diversity Group 2 GWs and vice-versa. If preloading is not implemented and each script is uploaded to the payload just-in-time from the SCF via the TT&C, then there can be an additional delay. It may be expected that scripts or script changes will be pre-uploaded to the payload so that this step is not performed as part of the switch-over. The selected script can be loaded into to the payload memory for execution which may take additional delay.

The SCF can issue a command to the payload to load the appropriate script for the given diversity switch into the payload computer for staging of execution. Due to higher priority commands that are currently in execution on the payload, the given request may be rejected by the SCF. In at least one implementation, according to the SOC, payload ranging is performed twice per hour, which ties up the command channel (e.g., for several minutes). If there is a rainfade at any moment during that time, the switch may be delayed. The SOC can dedicate the second TT&C command channel for diversity switching. The SCF can signal when a request is rejected and the expected back off duration until a diversity switch can be requested again.

The gateway segment can apply the primary configuration and software 120. Upon RF Gateway switch-in, the RFT Carrier Monitor Subsystem (CMS) of the diverse RF Gateway can be commanded by the RF Gateway diversity controller via its central RFT CMS at the NOC to switch its carrier monitoring plan to the plan applicable for the primary RF Gateway that the diverse RF Gateway is taking over for. The RFT CMS of the diverse RF Gateway can be preloaded with the carrier monitoring plan for all primary RF Gateways since it can switch-in for any primary RF Gateway. In at least one implementation, the CMS is the software subsystem of the RFT and is attached to a spectrum analyzer, which monitors the signal, strength, and shape of forward outroute carriers.

Since the gateway uplink forward frequency bands may be common across all primary RF Gateways and diversity RF Gateways, the CMS carrier monitoring plan may also be common for all, which can avoid necessity of switching of the plan. Shifts or minor changes in outroute center frequencies and Msps may not change the frequency band that is being scanned by CMS for total power if the changes remain within the original span of the frequency of the GW uplink forward band. This may assume no MHz carve out for any forward capacity for VNO outroutes such as for VNO MHz allocations instead of VNO Mbps allocations.

Diverse RF Gateway components can be configured to determine their identity for switching in for the primary RF Gateway. Based upon the given identity, diverse RF Gateway components can pick up their configuration for a given identity. It may be assumed that each of the primary RF Gateway configurations are preloaded into memory for faster switching. These primary RF Gateway configuration files can be pre-generated such as by a GW configuration tool and NMS for each primary RF Gateway for each of the diverse RF Gateway components. Because of the frequency of rainfades, it would be beneficial if the switchover to a diverse RF Gateway were fast enough such that the upper layers of the system, such as bandwidth allocations and TCP do not have to spend time reacting or retransmitting data.

In certain scenarios, updating the RF Gateway bootstrap files may cause the GW software and firmware to be loaded based upon the different versions specified in their configuration profiles files based upon their assigned identity. The software and firmware may not change between diverse switchovers for diverse RF Gateway components so that they can meet required switchover times. To achieve this, all RF Gateway components may use compatible software (SW) and firmware (FW) versions across all primary RF Gateways and diverse RF Gateways. Since it may not be practical to have all RF Gateway components upgraded at the same time, it may be assumed that all RF Gateway SW/FW is backward compatible and forward compatible for the configured enabled features on any RF Gateway. Thus, SW/FW may not have to be reloaded upon switchover and the diverse RF Gateway SW/FW can support the functionality and configuration of any primary RF Gateway at any time. Effectively, the RF Gateway components can maintain their currently loaded RF Gateway component SW/FW and may not reload their SW/FW upload switchover or repointing to the primary RF Gateway bootstrap files.

The SW/FW of the IDM can support the various inroute multiplexing types whenever a primary RF Gateway's configuration specifies a different configuration of inroute multiplexity types. The IDM firmware image types loaded into individual FPGAs of an IDM can include Mobility for Aero, A-SCMA or SCMA, and Linear TDMA. TDM for CBoS can be a software implemented multiplexing type and may not have a separate IDM firmware image from the TDMA firmware image. Since the IDM FPGA may be loaded with FW for its given inroute group type to match the primary GW's inroute group types, and in order to meet the required switchover time allocations, then the same OMM SW/FW can support all outroute types. The SW/FW of the OMM can support all outroute types and configurations without having to reload their FW/SW whenever a primary RF Gateway's configuration specifies a different configuration of the outroute.

In certain scenarios, RF Gateway reconfiguration may cause reconfiguration of the diverse RF Gateway with the user beams, outroutes, inroutes, and system information of the primary RF Gateway. OMMs can bring up their outroutes based upon the given configuration. This step can pick up via MFS the outroute and inroute configuration for the primary RF Gateway database so that configuration can be loaded into the diverse RF Gateway components. Thus, the diverse RF Gateway components can assume the personality of the primary GW component they are impersonating. In at least one implementation, this step can update the diverse RF Gateway so that it generates the correct outroute and inroute carriers matching the switched-out primary RF Gateway. Any reconfiguration of the device drivers of the RF Gateway via the NMS while the diverse RF Gateway is switched-in can also be applied by the NMS to the primary RF Gateway when it is switched back in.

One or more of the diverse RF Gateways can be provided with, or potentially provided with its own uplink forward frequency band or frequency range clearances, independent of the primary RF Gateways it is configured with. For example, the primary RF Gateway may have different uplink forward bands from its switched-in diverse RF Gateway. The RFT of the diverse RF Gateway can be responsible for upconverting the L-band outroute carriers to the Ka-band or V-band frequencies to transmit to the satellite payload. The L-band center frequencies of the primary RF Gateway configured outroutes can be used by the diverse RF Gateway. Since the same entire forward uplink may be generally used by each RF Gateway, all of the RF Gateways can utilize the same uplink forward frequency bands even though they may be mapped to different downlink forward bands for different user beams.

The uplink forward frequency plan may be common to all RF Gateways. Even though the user beams transmitted to by the uplink forward outroutes may be different, the actual center frequencies and Msps can be the same across all of the primary RF Gateways. This can assume no MHz carve out for any forward capacity such as for VNO MHz allocations instead of VNO Mbps allocations.

Outroutes may be dynamically adjusted for the center frequency and Msps to account for dynamic changes in the output environment, such as satellite filters or interference or fades. In addition to the RF Gateway reconfiguring its outroutes based upon the latest OMM configuration, the OMM can also be updated by the ORC with the latest state of each outroute's center frequency and Msps based upon its dynamic changes.

The diverse RF Gateway may need to respect any downlink forward frequency band or frequency range clearances that the primary RF Gateway was configured with. For example, if the primary RF Gateway was not allowed to use certain downlink forward frequency bands or ranges, then the diverse RF Gateway can be configured to also not use those frequency bands or ranges. The diverse RF Gateway can be implicitly compliant since it can be configured to only the use the allowed downlink forward frequencies via configuration it reuses from the primary RF Gateway. The forward downlink can reflect dynamic changes in its frequency plan. The primary RF Gateway can have its SNC collect and store the current noise floor power levels and dynamic configuration state for each of its inroute channels. This can be communicated to the diverse RF Gateway when it switches in for the given primary RF Gateway.

While a diverse RF Gateway is in standby mode waiting to be switched-in for a primary RF Gateway, it may be preferable that it maintain its standby configuration. One configuration can be to put up dummy outroute carriers for transmitting to the satellite payload while in standby. These dummy outroute carriers can be operationally adjusted, and at RF Gateway install can have their outroute power levels adjusted like any RF Gateway so that its outroutes are all the same general transmission strength. In an implementation, the NMS can preload the OMMs with this standby configuration. It can be noted that in some scenarios, SGWs do not necessarily provide end-user data codeblocks to send over this outroute. Therefore, in such implementations, only randomized null codeblocks may be sent by the OMM over these outroute carriers. This standby configuration can just be a copy of any primary RF Gateway's configuration such as the last switched-in RF Gateway's configuration or always RF Gateway #1's configuration. Note that if diverse RF Gateway utilized a copy of a primary RF Gateway's configuration while it is switched-out, it may be impracticable to update its configuration, but it may become updated if the primary RF Gateway's configuration is updated. The common uplink forward frequency plan can be implemented. In one such implementation, all of the primary RF Gateways and diverse RF Gateways may share the same uplink forward frequency plans so that no special or separate diverse RF Gateway frequency plan is needed. This may assume no MHz carve out for any forward capacity, such as for VNO MHz allocations instead of VNO Mbps allocations. Furthermore, the last primary GW forward frequency plan can be implemented.

Configuration profiles of the RF Gateway components can be stored on the NMS RF Gateway MFS located at the diverse RF Gateway. The NMS can replicate and pre-emptively keep up to date the entire set of RF Gateway configuration profiles on each diverse RF Gateway for each primary RF Gateway as they are updated from the NOC NMS server to the diverse RF Gateway MFS server. The given downloads from the NOC can be replicated whenever any of the primary RF Gateway component configurations change, and this can save time during the switch-over. The SNC may temporarily dictate adjustments in the RF Gateway configuration separately from the NMS-provided configuration. This may be transient configuration changes of RF Gateway components such as increased apertures. During RF Gateway switchover and for a brief period after the switchover, the SNC can increase inroute apertures in the IDM to allow for errors in differences between timing of RF Gateways.

The RF Gateway configuration profiles can be configured to specify the RF Gateway component SW and FW that should be utilized. The NMS can be configured to pre-emptively replicate the needed RF Gateway SW files and FW files from the NOC NMS server to each of the diverse RF Gateway MFS servers as they are updated instead of waiting for the switch-over.

In an aspect, the transient state in the RF Gateway OMM and IDM may be replicated to the diverse RF Gateway from the primary RF Gateway. Sharing of RF Gateway state information may not be necessary or done and all state information may be stored in the SNC such as with the SGW and IDC instead. The SNC can be configured to push the needed transient state information to the switched-in diverse RF Gateway upon switch-over from what the SNC knows about or last told to the switched-out primary RF Gateway. In system architectures that deploy the SGW and IGM at the RF Gateway site, such as for a distributed deployment architecture, the replicated RF Gateway state can be conveyed directly from the primary RF Gateway to the diverse RF Gateway in near-real time in order to facilitate fast switchover times. If the switched-out RF Gateway is operational and able to function, the switching-out RF Gateway can replicate its last known RF Gateway dynamic state to the switching-in RF Gateway.

Some system information can change due to the RF Gateway switch-in. The primary RF Gateway's configured values can be preserved from the different configuration values utilized by each of the diverse RF Gateways. In at least one implementation, this information can be stored by GW ID in the GW Configuration data provided to a given primary RF Gateway and each of its diverse RF Gateways so that each RF Gateway picks up its configuration data with a value for each to use which is pre-replicated by the NMS before any switch-overs. This is because the NMS may not be highly available, and the RF Gateway configuration may need to be already available for a switch-over. The system information can include the transmitting RF Gateway ID sent to terminals. There can be a primary RF Gateway ID that can stay the same, but the transmitting RF Gateway ID can change based upon the actual switched-in RF Gateway ID. This can allow terminals to detect and possible modify their behavior based upon the switch-in of a different transmitting RF Gateway ID. Each RF Gateway, including each diverse RF Gateway can get a unique RF Gateway ID as well as each primary RF Gateway to use in this transmitting RF Gateway ID field.

The space segment can execute forward payload switch-in commands 122. The payload can switch outroute before inroute so that the outroute may have switched just before the inroute from the primary RF Gateway to the diverse RF Gateway. This may cause out of order inroute codeblocks reaching the SNC since the delay between each RF Gateway and the SNC may be different. Since the outage time of return path on the payload may be much larger than the possible delays associated with rerouting around the backhaul network, it may not be expected that any out of order codeblocks will be received by its SNC during the transition, so they can be discarded if detected or ignored to allow them to pass through to the IRC processing.

The switches on the payload for a RF Gateway forward path can all switch nominally concurrently. This may also be true of the RF Gateway return path via the payload when it is switched. This can assume the switching is immediate from the old outroute to the new outroute without a drop in carrier power even though a few symbols may be dropped during the movement of the payload switch. Each inroute band can be switched after its outroute band is switched-instead of switching all outroutes and then all inroutes. This may not be supported by limits of payload switching capabilities and scripting.

While the payload is being switched from a primary RF Gateway to a diverse RF Gateway, the physical switches on the payload can be in a transient state between the input forward signals of the primary RF Gateway and the input forward signals of the diverse RF Gateway. In order to prevent possible damage to the payload during this small transition period due to possible large unpredictable variations in the signal, the input forward signal can be muted just before the payload forward switchover until just after the payload forward switchover. This muting can be performed for the duration of the worst-case switching duration for any of the possible switch changes. Initiation of the payload return path switching can wait until the switching is completed and the muted is removed. If the muting is shown to not be necessary, then the forward path switchover duration can be shortened to the average duration instead of worst-case duration by not performing the muting and allowing the diverse switched-in out.

Due to higher priority commands that may be currently in execution on the payload, the given execution command may be rejected by the SCF. The SCF can signal when an execution is rejected and the expected back off duration until a diversity switch can be requested again.

In at least one implementation, the configuration for each outroute is configured with the list of outroute power levels for each of its possible RF Gateways, which includes its primary RF Gateway and its diverse RF Gateways. These outroutes can be power leveled initially during over-the-air-testing and then as needed during change windows for each primary RF Gateway in addition to switching in each diverse RF Gateway and performing power leveling via that RF Gateway.

Forward payload commands can be executed in the payload buffer of the diverse RF Gateway by the SCF 124. Steps 118, 122, and 124 can send notifications asynchronously with the requester waiting as shown in steps 112 and 126 as the payload switching progresses over time. Step 124 can be the payload performing the switching commands to perform for the return path. Similarly, step 122 shows the switching command to perform for the forward path. Upon completion by the payload, a final notification can be sent to the asynchronously waiting requester 126. That final notification or any intermediate notification may show the success completion status or a notification with a failure indication status. If there is a failure indication received by the requester, then the switch-in can be rolled back 128. This can undo the switching if necessary and attempt to restore the payload to a known state for future switch requests if possible.

The terminal can lock the diverse outroute 130. Given the ephemeris data from the SCF, the GPS locations of the primary RF Gateway, and the diverse RF Gateway being switched-in for the primary RF Gateway, the change in delay between the payload and each of the RF Gateways can be calculated and the diverse RF Gateway can compensate for this delay. The diverse RF Gateway can impersonate the primary RF Gateway by adopting the start of frame marker and frame number of the primary RF Gateway. This can allow any terminals trying to lock to the diverse RF Gateways to be able to assume the same start of frame marker as their initial for the diverse RF Gateway from their last received signal from the primary RF Gateway.

Since the signal for each RF Gateway can travel through slightly different paths within the satellite payload, the system can measure the initial differences for each RF Gateway on the payload and measure the Doppler for frequency offsets for each switch path within the payload. This can be performed at RF Gateway install time and monitored for drift over long durations or if switch paths have failed and replacement paths are being utilized. The system can calibrate and measure the oscillator differences initially and relearn them as needed in case differences are detected from the previously learned values. By learning and adjusting for these differences, these values can be included in the timing compensation when a diverse RF Gateway is switched-in for a primary RF Gateway with different learned values.

Outroutes can be set up the same on diverse RF Gateway as they were setup on the primary RF Gateway. There is a possible exception to this if there are failures in the diverse RF Gateway that make it impossible to match the primary RF Gateway's outroutes. The diverse RF Gateway site can assume the identity of the given switched-out primary RF Gateway and assume its constraints. For the "multiple failure" where a primary RF Gateway fails and enough OMMs fail (i.e., primary and backup OMM pair fail) in the diverse RF Gateway that is selected, the terminals can be configured such that ones left without their last locked outroute can wait until a carrier is brought up at their original outroute center frequency. Terminals can be configured such that those with outroute move supported can act to lock to any outroute that comes up that matches their previous lists of outroutes in their resource pool from before the RF Gateway switchover. Terminals could potentially need to fall back to the outroutes listed in its satellite-based configuration file. Since this is a "multiple failure" scenario, it may be assumed that these terminals do not need to acquire an outroute within the switchover requirement time for redundant GW switch in.

One or more of the terminals can periodically save its last good Frequency Lock Loop (FLL) state as close to and before outroute outage as possible. For example, an optimistic FLL lock can assume the outroute size is greater than a minimum Msps size. Each terminal can perform optimistic FLL locking, which can include performing adjustable gain control (AGC), Unique Word (UW) and Forward Error Correction (FEC), and locking the FFL. In at least one implementation, AGC may be employed since the outroute is coming from the diverse RF Gateway, and therefore its outroute power level may not exactly match the primary RF Gateway outroute's power level. The terminal can attempt to reuse the periodically saved frozen FLL if it is the same satellite. If it is a Mobile or Aero terminal, then it may be handing over to another satellite and so it may not be able to reuse the saved frozen FLL. For terminals experiencing error cases, such as bad EsNo, an additional outer locking loop can be used that is more pessimistic and takes longer.

The gateway segment can send system information messages for terminal startup (e.g., transmission layer and/or Satellite Link Control and/or Medium Access Control (SLC/MAC) layer SysInfo) 132. SLC/MAC is the terminology used for link layer protocols of the satellite and the link layer access mechanisms used by the system. This is similar to defining how Ethernet (as a link layer) has its packets defined and how transmission occurs on a shared ethernet LAN or hub. Terminal transmit preparation may depend upon this step. The RF Gateway and NMS SDL may start trying to send its SysInfo messages out of its RFT even if the payload is not ready (i.e., no synchronization between the steps of the GW and payload). These SysInfo messages can be sent by the diverse RF Gateway even if the satellite payload switching and connectivity has not come up yet. The NMS SDL may not be highly available and may not be operational to send its SysInfo messages, which may make its management services unavailable while it is down.

The SFNP can contain the timing information for terminals to calculate the RF Gateway to satellite delay. The timing information can be inserted by the Timing Synchronization Application (TSA) at the RF Gateway based upon the template SFNP generated by the SGW, as described above. TSA can be the software and hardware subsystem within the OMM of the RF GW (and SNC where the SGW is located) that provides the timing of the start of frame boundary pulse and frame numbering required for a TDMA satellite network. The SFNP can identify which RF Gateway is switched-in. There can be a new field in the SFNP message that specifies which RF Gateway is currently active and sending its SFNP. Since there can be multiple diverse RF Gateways, the RF Gateway ID may be used as the new field in case the switch-over to one diverse RF Gateway failed and another diverse RF Gateway needs to be switched-in instead.

Since the diverse RF Gateway may be located far from any of the primary RF Gateways, its satellite to RF Gateway delay may be different from the primary RF Gateway's delay. This new delay can be calculated based, for example, upon the GPS-based latitude and longitude location of the RF Gateway RFT. Using the location of the RF Gateway may not be accurate enough, however, for diverse RF Gateway purposes without all the terminals performing bootstrapping to accurately determine the actual timing to reach the RF Gateway. This may be partly due to the variability of the satellite payload location within its station keeping box at its orbital location.

To calculate the delay with the needed accuracy, including accounting for the satellite payload location to avoid bootstrap, the system can use ephemeris from SCF to calculate satellite-GW delay. GW and terminals may not know the satellite location relative to the diversity GW at the time of switch. Knowing the location of the satellite relative to the previous GW may have too many errors to do the adjustment calculation based on relative GW locations. When terminals switch, the current SFNP may not have enough information for the terminals to have stayed in steady state and hit the aperture. The system may use SCF-provided ephemeris data in order to compute the new delta delay (or absolute time delay) in the SFNP. This is because the satellite location within its box may have enough error that calculating the delta without knowing the satellite location can cause them to miss the aperture (and which would have forced them to exit steady state). The SCF can provide daily (or near-real-time) updates to the system, which in turn can provide the updates to each RF Gateway via its SNC to calculate its delta delay. The SCF can push ephemeris updates as needed after major orbital maneuvers that impact the accuracy of the ephemeris reported satellite location. The accuracy of ephemeris data from the SCF can preferably be within required tolerances in order to accurately calculate the start of the frame marker to synchronize the diverse RF Gateway with the timing of the primary RF Gateway it is switching in for. This can put limits on the SCF's ability to measure the satellites position within its orbital slot and the accuracy of the box within the satellite can be maintained.

There may be circumstances where the system cannot get SCF ephemeris to calculate the satellite-GW delay. If such a system cannot get access to satellite ephemeris from the TT&C, such as for non-technical reasons, the system may have to restore to bootstrap mode with long switch delays. The system may need to expand the size of the bootstrap aloha and apertures temporarily during and immediately after switchover in order to compensate for the inaccuracy possibly encountered if the system does not have access to the satellite ephemeris to compute where the satellite is.

Normally, an SFNP can be sent once every superframe and can communicate the satellite-GW delay utilizing correction delta relative to the previous SFNP's timing. To speed up this process to allow terminals to determine their satellite-Terminal delay with sufficient accuracy, rapid fire SFNP can be performed. In an example rapid fire SFNP, the SFNP can be temporarily sent once every frame instead of the normal once every downlink superframe so that terminals can quickly acquire the switched-in RF Gateway's timing. Multiple SFNP messages may be needed since the timing may be specified as a delta to its previous SFNP.

Temporary absolute timing in SFNP can also be performed. For the short period after switchover, an optional absolute GW timing value can be used instead of a delta timing value and sent out for several messages by the diverse RF Gateway. This message may still need be sent out multiple times for reliability of reception reasons, but a terminal can use just one of these special SFNPs to acquire the diverse RF Gateway timing info it needs. In an implementation, the diverse RF Gateway can be configured to impersonate primary RF Gateway timing. A diverse RF Gateway can attempt to assume the exact same start of frame marker and frame number of the primary RF Gateway it is switching in for. This can allow terminals to assume the same timing independent of which RF Gateway is switched-in.

When the terminal detects that a diversity switchover happened, it can reset its delay history from the previous RF Gateway. The terminal can remember the delay history for each switched-in RF Gateway ID encountered for a maximum configuration duration instead of just discarding it after resetting (i.e., primary and two diverse RF Gateways) so that it can be used the next time that the same RF Gateway is switched-in. If it is a long time between the encountering of an RF Gateway, the delay history data may become stale and may be discarded anyway. The system can be configured to always use ephemeris-based data in the SFNP for satellite-gateway delay for systems which have ephemeris available.

Due to the locked out inroute/outroute reconfiguration, the terminal may not have to wait for other system information messages with configuration information after the switchover before the terminal can start transmitting. All RF Gateways can be time synchronized via GPS and the Institute of Electrical and Electronics Engineers Precision Time Protocol (IEEE PTP) and can use the same frame numbering sequence. The diverse RF Gateway may be time synchronized with each primary RF Gateway; thus, all primary RF Gateways can also be time synchronized with each other. If GPS antennas are down or if GPS is down, each of the GPS receivers at each of the sites of the RF Gateway and SNCs can continue to free wheel until GPS is restored. If an SNC's GPS drifts farther from one or more of its RF Gateways, then it may have its frame counters out of sync with the RF Gateways and terminals likely causing an outage until GPS is restored via PTP.

Since the payload switch time may be longer than the expected delay from the SNC or due to differences in delay between the primary and RF Gateway, no special processing may be required to handle out of order or duplicate codeblocks of the replication traffic during the switch-in. If the payload forward switch duration is sufficiently short compared to the other delays, the terminal can detect these out of order codeblocks and duplicate codeblocks.

Since the inroute and outroute may not switch simultaneously, an inroute transmission path may use the primary RF Gateway, for a duration, even though the diverse RF Gateway has been switched-in by the payload for the outroute transmission path. The terminal may lock to the outroute from the Switching-in RF Gateway while still transmitting to the Switching-out RF Gateway since the forward and return paths occur separately which can minimize the return path outage time. The SCF may reject this script execution due to a higher priority command pre-emptying its execution. Thus, the system can be configured to roll back or retry the switchover after a back off.

Since the payload can switch the outroute before the inroute and there can be replication from both RF Gateways during the switchover, a terminal can transmit on its primary RF Gateway's inroutes even though it has not locked to its diverse RF Gateway's outroutes yet. The terminal's transmission blocking may not prevent transmissions within a given short duration of losing an outroute to allow for the minimal switchover interruptions even though it can enforce blocking transmissions after a longer duration of no outroute.

The SNC data applications, such as the SGW, can stop replicating their data traffic to both the primary RF Gateway and the selected diverse RF Gateway once the switchover transition has completed 134. Once the switchover transition is completed, based upon commands from the RF Gateway diversity controller, the SDN controller can update the segment routing lists at the SNC(s) for the RF Gateway's user beams to remove segment lists of the primary RF Gateway for data traffic for those user beam but keeps the segment route lists for the diverse RF Gateway. In order to avoid terminals getting permanently confused during a switchover, such as if it doesn't hear the system information that the switchover completed, terminals can have a maximum timeout of the switchover. After this timeout, the terminal can initiate normal outroute recovery mechanisms, if needed. A misbehaving terminal may potentially transmit on inroute channels that are reserved for it on the frozen BAPs, but then may not properly hear the updated BAPs from the switched-in RF Gateway's IDMs on the switched-in RF Gateway's outroutes. This may lead to interference on these inroute channels until the maximum switchover timeout expires.

After the initial system information messages are sent to terminals, the remaining system information messages as normally required for operation can be handled including the updated SFNP 136. The updated SFNP can specify that the switchover steps have completed. Terminal transmit preparation can include terminal delay calculations, terminal transmit power, and IDMs attempt to lock their inroutes 138. As a result of the new SFNP packet from the switched-in RF Gateway, the terminal can recalculate its delay to the RF Gateway in order to prepare for its resumption of its transmissions to the RF Gateway. The return path power level from the terminal may be reset when switching RF Gateways since terminals may be running hot due to the primary RF Gateway return downlink degraded due to rainfade.

The system can learn and use inroutes 140. Since the inroutes can be in a frozen configuration, a terminal who has heard the IGDP and other inroute system information messages can resume transmissions on inroutes assuming that the inroutes are the same. This can be based upon the switchover state as being in-progress as specified in the SFNP. For terminals who have just turned on or who have not heard the frozen inroute system information messages, the terminal may have to wait until it has heard and processed the normal system information messages before transmitting and using the inroutes. This can be based upon the switchover steps state as being in-progress as specified in the SFNP. The associated IPGW can be maintained over the RF Gateway switchover. The Satellite MAC addresses of a terminal may not change on switch-in of the diverse RF Gateway since the RF Gateway ID may not be part of the MAC address for the terminal.

The inroutes can be unfreezed after switchover via new BAPs. Once the SFNP specifies the switchover step state as being over and the switchover has completed either successfully or rolled back, terminals can resume having to learn of inroute changes via IGDP like normal when the IGM sends new updated BAPs on the outroutes of the switched-in RF Gateway. SNC monitoring of delay to the diverse RF Gateway may be re-evaluated. BAPs may be sent out earlier based upon increases in delay between the SNC and the diverse RF Gateway compared to the delay between the SNC and the primary RF Gateway. SNC IGM may need to be notified of delay increases and decreases so that it can send out new BAPs with enough lead time to reach the terminals in time. Each SNC may be given a monitoring agent that can monitor and detect maximum delay between the given SNC and each of its RF Gateways, including all of the switched-out diverse RF Gateways. For each RF Gateway ID and SNC pairing, a separate lead time may be adjusted in the IGMs at each SNC as it changes over time due to WAN failures or diversity switches. As part of a diversity switch-over when the IGM sends out its BAPs to both RF Gateways involved in the switch-over, the IGM may utilize the different maximum delay associated with each RF Gateway in order to send out its BAPs with enough lead time to reach the terminals in time for their use.

Actual outroute outage can occur if there is a predictive trigger 142. This can represent the duration during which the forward outroute is unavailable, which can cause an outage on the forward link if a switch-over occurs before any rainfade outage was experienced, assuming that the rainfade prediction was accurate. An actual inroute outage can occur if there is a predictive trigger 144. This can represent the duration during which the return inroutes are unavailable, which can cause an outage on the return link if a switch-over occurs before a rainfade outage, assuming that the rainfade prediction was accurate.

After completion of the critical path steps described above to restore end-user communication, the following additional steps can be performed: signal RFT CMS of the switch-in, monitor for switched-in RF GATEWAY failures, monitor for SDN failures, and/or diagnose switched-out RF GATEWAY failures. The RF Gateway diversity controller can notify the central RFT CMS at the NOC that it may be preferred that the switched-in diverse RF GATEWAY monitors the selected primary RF GATEWAY's outroute carriers.

There can be several operational phases of setting the power levels of outroutes for each diverse RF Gateway, which can include initial power leveling, pre-operational power leveling, and/or operational power leveling. When the diverse RF Gateways are first installed, each diverse RF Gateway can be configured with the frequency plan of one of the primary RF Gateways. The power levels for these outroutes can be power leveled over the air before initial service launch. The leveled outroute power values can be used as the initial power levels for each diverse RF Gateway. Each diverse RF Gateway can be subsequently switched-in for each primary RF Gateway. The power levels can be adjusted while switched-in for each primary RF Gateway before initial service launch using the primary RF Gateways anticipated initial production outroute configurations. These power levels can be configured into the NMS for each diverse primary RF Gateway with separate values for each of the primary RF Gateways that it switches in for. The diverse RF Gateway can utilize its configured values when it switches in for one of the primary RF Gateways.

Since diverse RF Gateway switching may not be necessarily controlled explicitly during normal operations, the utilization of the diverse RF Gateway for each primary RF Gateway can occur frequently enough to accumulate outroute power levels during production over long-term operation. The system information message (i.e., SFNP) can specify the primary RF Gateway ID and the active switched-in RF Gateway ID, which may be the primary RF Gateway ID or one of the diverse RF Gateway IDs. This can inform the terminal when a specific diverse RF Gateway is being switch-in and a diverse RF Gateway switch-in is in progress if the primary and active transmitting RF Gateway IDs do not match in the system information message. The terminal can accumulate a running Signal Quality Factor (SQF) average for each outroute it locks to for the period that it sees each RF Gateway ID for each collected hour and can report it once a day. This Terminal can report SQF data for diverse RF Gateways and can allow the offline aggregation and comparison of SQF values for each outroute for each RF Gateway averaged across multiple terminals. These aggregated SQF values can be used to recommend adjustments of the RF Gateway power levels for each outroute, including for the diverse RF Gateways when they are switched-in for a primary RF Gateway.

By utilizing the offline analysis using the aggregated SQF values for each outroute for each RF Gateway, including for the diverse RF Gateways when they are switched-in, the power level configurations can be adjusted during production as appropriate if there are outroute frequency plans change. Each diverse RF Gateway's power levels for each primary RF Gateway can be stored within each primary RF Gateway's configuration profile for each outroute. Thus, each outroute can have multiple power levels: one for the primary RF Gateway, one for a first diverse RF Gateway, and one for a second diverse RF Gateway, etc. A given RF Gateway can know its unique RF Gateway ID and the diverse RF Gateways' IDs so that each power level in a primary RF Gateway's configuration can be expected within the list of power levels to be indexed by each given RF Gateway's unique ID within the configuration.

Once the primary RF Gateway has recovered from its rainfade, the primary RF Gateway can be switched back from its diverse RF Gateway automatically. This can follow the same sequence and timeline as described above with the roles of the RF Gateways reversed. Since the diverse RF Gateways can be a shared resource of the primary RF Gateways, the switchback can occur as soon as rainfade has been recovered and it is predicted that the rainfade will not to occur again over the next window of time.

In some applications and scenarios, it may be preferred to stay with a switched-out diverse RF Gateway unless forced to switch-out by another primary RF Gateway instead of suffering switching outages to always switch back immediately when the RF Gateway experiences clearsky. Additionally, the Q-band rainfade threshold can be different than the Ka-band threshold with a separate Q-band threshold. The rainfade prediction can be trained online based upon OTA testing periods to ensure that the prediction model maintains its desired accuracy with the Q-band thresholds since it may be originally trained with Ka-band historical data. Over-the-air can use the satellite just after it is launched for preliminary testing before it is brought into full service with live paying customers.

The rainfade predictions described above can be triggers for performing an immediate switch-in operation. The time window for the prediction change can be, for example, several seconds and the spatial accuracy of the prediction can be the width of the given primary RF Gateway's narrowband beacon transmission link. The prediction accuracy of this small window of time and narrow spatial scope may allow for good accuracy of prediction just in time to perform the switch-in.

Since the reactive outage time may be longer than desired, the system can be configured to preemptively predict rainfades and thereby determine which primary RF Gateway the diverse RF Gateway can be prepared to switch-in for a likely upcoming rainfade. This prediction can be, for example, at the frequency of the radar weather data feed updates. Therefore, given the limitations of radar-based rain cloud predictability, the prediction time horizon may be limited. A beacon-only just-in-time rainfade prediction model can be applicable for non-US-based Gateways, but this may only have a short prediction horizon (i.e., measured in seconds) while the radar data may have a longer prediction horizon (i.e., measured in minutes).

The radar data can be normalized with each RF Gateway as the new center and cropped for the maximum radius of input radar data. This can allow for each normalized radar data set to be trained for a given RF Gateway and potentially the trained model could be reused for different RF Gateways with similar rain characteristics or rain regions to learn. The input radar data can include the sequence of recent historical data samples, which can also be included as input. This can allow the model to attempt to predict movement of rain clouds over the sequence of samples up to the maximum time window.

The radar data feeds may arrive more frequently than the maximum prediction time horizon. The radar data can be aggregated across the entire US and sent as one data feed update from the radar data providers. With each arrival of a radar input data, the input data can be normalized and input into a radar prediction model for each RF Gateway to query if each RF Gateway is predicted to have an upcoming rainfade within the time horizon. Each data feed arrival can be used to predict if there will be a rainfade event within the horizon of the next time period. Since this may be a sufficient time for the preemptive preparation work of the diverse RF Gateway to complete, a longer time horizon may not be needed.

A SW-coded algorithm can be used to aggregate and arbitrate among the model predictions for each RF Gateway. This preemptive diversity switch controller algorithm can take as input the current state of any possible payload switch HW failures, payload HW switching constraints, RF Gateway site failures, diversity RF Gateway switched-in states, primary RF Gateway switched-out states, RF Gateway operator-invoked switches, and/or the weather "now casting" preemptive predictions for each RF Gateway. These controller inputs can be processed using a small set of SW-implemented "rules" instead of trying to learn machine learning (ML) approximations of these rules from that exact same SW implementation. A preemptive setup can be used for switch-in of a selected diverse RF Gateway on a first-come-first-service basis based upon the preemptive rainfade ML prediction since contention for the two diverse RF Gateways will be very statistically rare. In the event that multiple RF Gateways may be predicted by the preemptive prediction model to likely have upcoming rainfade with the time window, the priority of each primary RF Gateway can be used to determine which primary RF Gateway is selected for preemptive setup for an upcoming switch-in.

The accuracy of the preemptive prediction model may be much less accurate than the just-in-time rainfade prediction. The narrow RF Gateway beacon and the line of sight transmission link with the satellite may be a very small spatial area for prediction of when a particular rain cloud is blocking that line of sight. The granularity of each pixel or data point in the radar data may also be spatially large compared to the line of sight link size. As such, there is a chance that preemptive prediction may incorrectly choose the next primary RF Gateway to be switched-in. When the just-in-time rainfade prediction makes its prediction, it may predict a different primary RF Gateway. This may cause the reactive outage duration to be suffered instead of the shorter predictive outage duration. Other commercial weather prediction APIs may encounter longer prediction windows of hours and larger prediction areas such as cities, which may impact the accuracy of its applicability and correlation of the actual RF Gateway's beacon rainfades.

Beacon levels, just-in-time rainfade predictions, preemptive rainfade predictions, and/or actual switches can be recorded and logged for offline analysis. This analysis can be used to report on the accuracy of the prediction models as experienced during production for false-positives (i.e., when it incorrectly predicted rainfade when it was clearsky) and false-negatives (i.e., when it incorrectly predicted clearsky when it was rainfade), true-positives (i.e., when it correctly predicted rainfade when it was rainfade), and true-negatives (i.e., when it correctly predicted clearsky when it was clearsky). Outage calculations that record the depth and duration of fade events and whether the GW is switched-in or out including the diversity GWs can be included in the analysis along with timeliness of the switching to avoid outages. This analysis can be used to determine if the prediction model needs to be retrained utilizing the latest beacon rainfade data. This can nominally occur at least once a year as the system matures and payload and RF Gateway performance may degrade over time. Online training or training immediately as new data becomes available may not be performed such that accuracy can be gauged offline before deploying the model online into production.

The RF Gateway diversity controller can be configured to count each successfully executed switch on the payload for a given RF Gateway. This count may be provided as a report showing the running switch counts for each RF Gateway over the system lifetime relative to the linear trend line of the average number of switches per day to stay just under the maximum number of switches specified in the Space Segment design that the switches support.

Figure 3:
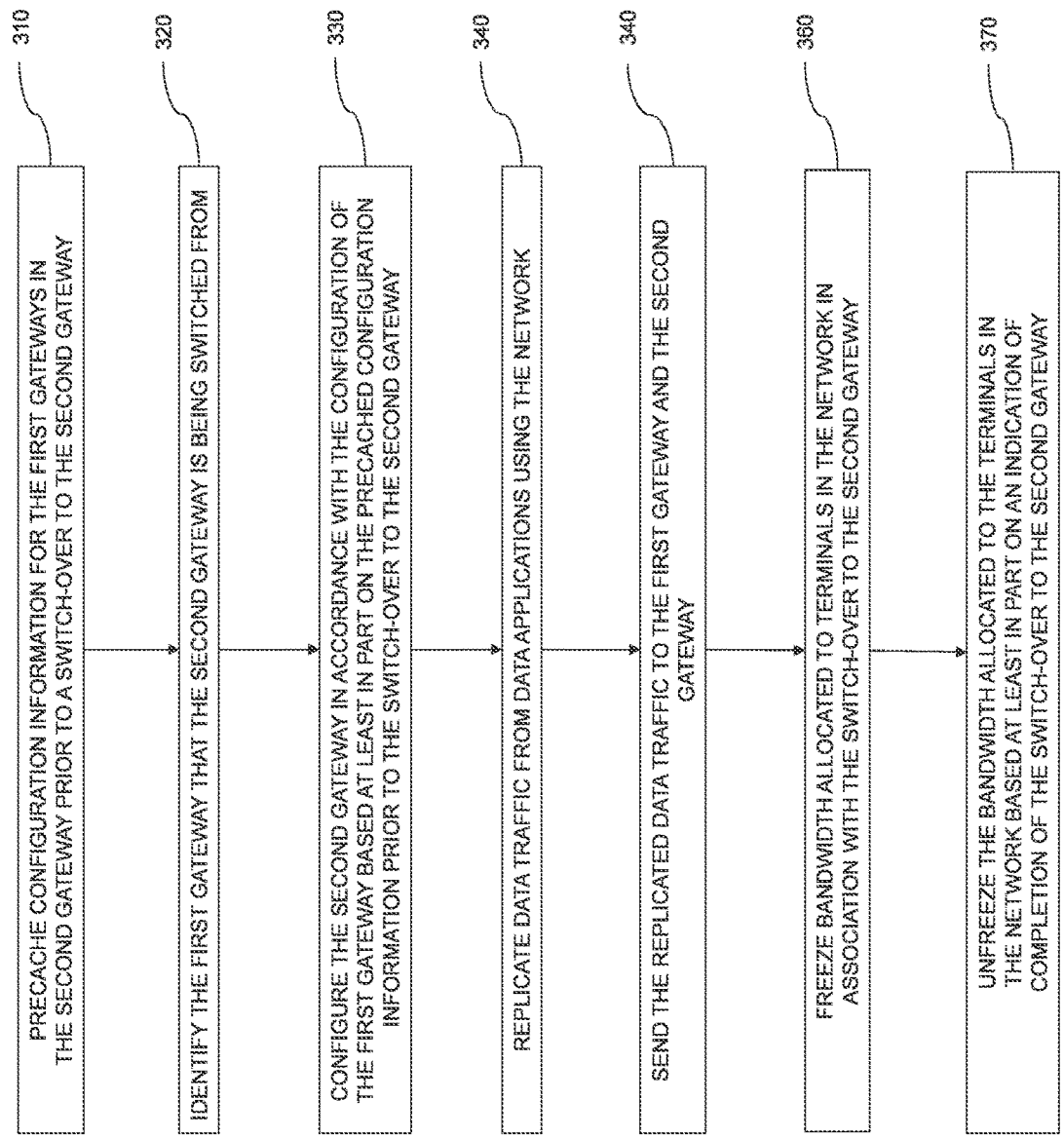
FIG. 3 is a flow diagram illustrating a method of switching from a first gateway to a second gateway in a network.

FIG. 3 is a flow diagram illustrating a method of switching from a first gateway (also referred to herein as a "primary RF Gateway") to a second gateway (also referred to herein as a "diverse RF Gateway") in a network. In at least one implementation, steps 310-370 are controlled and coordinated by the RF Gateway diversity controller. The NMS can precache configuration information in the second gateway, that is within the first gateways, prior to switch-over to the second gateway 310. This can be performed by the NMS on the Gateway before switching. The configuration information can include carrier and forward frequency plan configuration, return frequency plan, and gateway device configuration. As described more fully above, the NMS can replicate and pre-emptively keep up to date the entire set of RF Gateway configuration profiles on each diverse RF Gateway for each primary RF Gateway as they are updated from the NOC NMS server to the diverse RF GW MFS server. The RF Gateway diversity controller can identify the first gateway from which the second gateway is being switched from 320.

The RF Gateway diversity controller can signal the second gateway to configure itself in accordance with the configuration of the first gateway based at least in part on the precached configuration information prior to the switch-over to the second gateway 330. As described above, upon RF Gateway switch-in, the RFT CMS of the diverse RF Gateway can be commanded by the RF Gateway diversity controller (via its central RFT CMS at the NOC) to switch its carrier monitoring plan to the plan applicable for the primary RF Gateway that the diverse RF Gateway is taking over for. Diverse RF Gateway components can determine their primary RF Gateway identity. Based upon the given identity, diverse RF Gateway components can pick up their configuration for a given identity. The configuring of the second gateway can be performed by the OMM in the RF Gateway.

Data traffic from data applications using the network can be replicated 340. Replicating can be initiated by the RF Gateway diversity controller to the SDN WAN controller. The replicated data traffic can be sent to the first gateway and the second gateway 350. As described more fully above, the SNC data applications can replicate their data traffic to both the primary RF Gateway and the selected diverse RF Gateway during the switchover transition. The SNC data applications can utilize the updated segment routing lists to send to both RF Gateways. The replicated data traffic sent to the first gateway can be stopped based at least in part on an indication of completion of the switch-over to the second gateway. The RF Gateway diversity controller can signal the SNC data applications to replicate and can signal the SDN controller to enable replication. The sending of the replicated data traffic can be initiated by the RF Gateway diversity controller and performed by the SGW and IGM at the SNC.

Bandwidth allocated to terminals in the network can be frozen in association with the switch-over to the second gateway 360. Freezing can be initiated by the RF Gateway diversity controller and performed by the IGM at the SNC. As used herein, the term "frozen" or "freeze" includes maintaining and leaving unchanged the same amounts and frequencies of the latest bandwidth allocations of each terminal. The bandwidth allocated to the terminals in the network can be unfrozen based at least in part on an indication of completion of the switch-over to the second gateway 370. Unfreezing can be initiated by the RF Gateway diversity controller and performed by the IGM at the SNC. From the initiation of the switch over at the same time as when the start of replication of packets out of both RF Gateways, the BAPs are marked as "frozen" via a field within the BAPs. This can be unchanged until after the switch over re-establishes and completes (e.g., when replication is stopped). New bandwidth allocation requests and updates to backlog can be received. In association with the bandwidth allocated to the terminals in the network being frozen, the new bandwidth allocation requests and updates can be ignored. The SNC IGM can send out system information about frozen bandwidth (in BAPs) and its unfreezing.

Configuration of the second gateway can be locked during the switch-over to the second gateway to disallow changes to the configuration of the second gateway. Terminals in the network that are vulnerable to going idle due, at least in part, to the freezing of the bandwidth can be identified. Additional bandwidth can be allocated, during switch-over to the second gateway, to the identified terminals in the network that are vulnerable to going idle when capacity is available. Active terminals in the network can be permitted to remain active during the switch-over to the second gateway. However, inactive terminals in the network can be prohibited to go active during the switch-over to the second gateway.

State information including dynamic and transient knowledge about the satellite network can be stored in a common data center. The state information can include a distributed state, an inroute bandwidth allocation state, a timing state, a power state, a TCP acceleration state, a compression state, a web acceleration state, and other applications and service state. As described above, the transient state in the RF Gateway OMM and IDM can be replicated to the Diverse RF Gateway from the Primary RF Gateway. The SNC can push the needed transient state information to the switched-in the diverse RF Gateway upon switch-over from what the SNC knows about or last told to the switched-out primary RF Gateway. In system architectures that deploy the SGW and IGM at the RF Gateway site, such as for a distributed deployment architecture, this replicated RF Gateway state can be conveyed directly from the primary RF Gateway to the diverse RF Gateway in near-real time in order to facilitate fast switchover times.

Aspects of the present system may take the form of an entirely hardware implementation or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present systems, methods and computer program products are described below with reference to flowchart illustrations and/or block diagrams. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
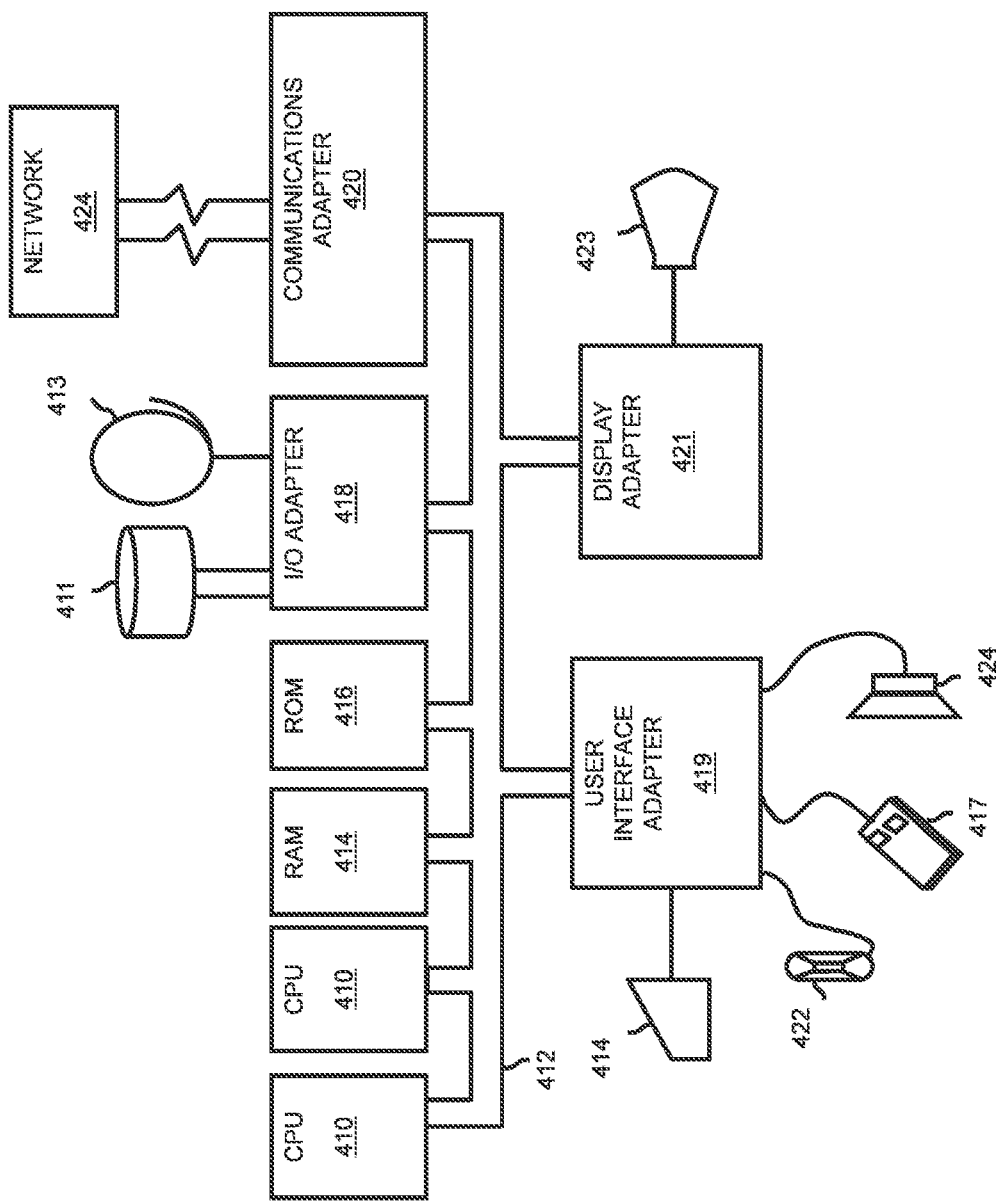
FIG. 4 is a block diagram illustrating components of an example machine configured to read instructions from a machine-readable medium.

Referring now to FIG. 4, a representative hardware environment is depicted. This schematic drawing illustrates a hardware configuration of an information handling/computer system. The system comprises at least one processor or central processing unit (CPU) 410. The CPUs 410 are interconnected with system bus 412 to various devices such as a random access memory (RAM) 414, read-only memory (ROM) 416, and an input/output (I/O) adapter 418. The I/O adapter 418 can connect to peripheral devices, such as disk units 411 and tape drives 413, or other program storage devices that are readable by the system. The system can read the inventive instructions on the program storage devices and follow these instructions. The system further includes a user interface adapter 419 that connects a keyboard 414, mouse 417, speaker 424, microphone 422, and/or other user interface devices such as a touch screen device (not shown) to the bus 412 to gather user input. Additionally, a communication adapter 420 connects the bus 412 to a data processing network 424, and a display adapter 421 connects the bus 412 to a display device 423 which may be embodied as an output device such as a monitor, printer, or transmitter, for example.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of switching from a first gateway within a plurality of first gateways to a second gateway in a network, the method comprising:
   precaching configuration information on the second gateway, that is within the plurality of first gateways, prior to switch-over to the second gateway;
   identifying the first gateway from which the second gateway is being switched;
   configuring the second gateway in accordance with the configuration of the first gateway based at least in part on the precached configuration information prior to the switch-over to the second gateway;
   replicating data traffic from data applications using the network;
   sending the replicated data traffic to the first gateway and the second gateway;
   freezing bandwidth allocated to terminals in the network in association with the switch-over to the second gateway; and
   unfreezing the bandwidth allocated to the terminals in the network based at least in part on an indication of completion of the switch-over to the second gateway.

2. The method according to claim 1, further comprising:
   receiving new bandwidth allocation requests and updates to backlog; and
   in association with the bandwidth allocated to the terminals in the network being frozen, ignoring the new bandwidth allocation requests and updates.

3. The method according to claim 1, further comprising:
   storing, in a common data center, state information including knowledge about the satellite network.

4. The method according to claim 3, wherein the state information includes at least one of a distributed state, an inroute bandwidth allocation state, a timing state, a power state, a TCP acceleration state, a compression state, a web acceleration state, and other applications and service state.

5. The method according to claim 1, further comprising:
   identifying terminals in the network that are vulnerable to going idle due, at least in part, to the freezing of the bandwidth; and
   allocating additional bandwidth, during switch-over to the second gateway, to the identified terminals in the network that are vulnerable to going idle when capacity is available.

6. The method according to claim 1, further comprising:
   permitting active terminals in the network to remain active during the switch-over to the second gateway; and
   prohibiting inactive terminals in the network to go active during the switch-over to the second gateway.

7. The method according to claim 1, further comprising locking configuration of the second gateway during the switch-over to the second gateway.

8. A method of switching from a first gateway within a plurality of first gateways to a second gateway in a network, the method comprising:
   precaching configuration information on the second gateway, that is within the plurality of first gateways, prior to switch-over to the second gateway;
   identifying the first gateway from which the second gateway is being switched from; and
   configuring the second gateway in accordance with the configuration of the first gateway based at least in part on the precached configuration information prior to the switch-over to the second gateway.

9. The method according to claim 8, further comprising:
   replicating data traffic from data applications using the network; and
   sending the replicated data traffic to the first gateway and the second gateway.

10. The method according to claim 8, further comprising:
freezing bandwidth allocated to terminals in the network in association with the switch-over to the second gateway; and
unfreezing the bandwidth allocated to the terminals in the network based at least in part on an indication of completion of the switch-over to the second gateway.

11. The method according to claim 8, further comprising:
receiving new bandwidth allocation requests and updates to backlog; and
in association with the bandwidth allocated to the terminals in the network being frozen, ignoring the new bandwidth allocation requests and updates.

12. The method according to claim 8, further comprising:
storing, in a common data center, state information including knowledge about the satellite network.

13. The method according to claim 12, wherein the state information includes at least one of a distributed state, an inroute bandwidth allocation state, a timing state, a power state, a TCP acceleration state, a compression state, a web acceleration state, and other applications and service state.

14. The method according to claim 8, further comprising:
identifying terminals in the network that are vulnerable to going idle due, at least in part, to the freezing of the bandwidth; and
allocating additional bandwidth, during switch-over to the second gateway, to the identified terminals in the network that are vulnerable to going idle when capacity is available.

15. The method according to claim 8, further comprising:
permitting active terminals in the network to remain active during the switch-over to the second gateway; and
prohibiting inactive terminals in the network to go active during the switch-over to the second gateway.

16. The method according to claim 8, further comprising locking configuration of the second gateway during the switch-over to the second gateway.

17. A computer program product for switching from a first gateway within a plurality of first gateways to a second gateway in a network, said computer program product comprising:
a computer readable storage medium having encoded thereon:
first program instructions executable by a device to cause the device to allocate bandwidth to terminals in the network;
second program instructions executable by the device to cause the device to freeze the bandwidth allocated to the terminals in the network in association with a switch-over from a first gateway of the plurality of first gateways to the second gateway;
third program instructions executable by the device to cause the device to unfreeze the bandwidth allocated to the terminals in the network based at least in part on an indication of completion of the switch-over from the first gateway of the plurality of first gateways to the second gateway.

18. The computer program product according to claim 17, further comprising:
fourth program instructions executable by the device to cause the device to precache configuration information on the second gateway, that is within the plurality of first gateways, prior to switch-over to the second gateway;
fifth program instructions executable by the device to cause the device to identify the first gateway from which the second gateway is being switched from; and
sixth program instructions executable by the device to cause the device to configure the second gateway in accordance with the configuration of the first gateway based at least in part on the precached configuration information prior to the switch-over to the second gateway.

19. The computer program product according to claim 17, further comprising:
seventh program instructions executable by the device to cause the device to replicate data traffic from data applications using the network; and
eighth program instructions executable by the device to cause the device to send the replicated data traffic to the first gateway and the second gateway.

20. The computer program product according to claim 17, further comprising:
ninth program instructions executable by the device to cause the device to receive new bandwidth allocation requests and updates to backlog; and
tenth program instructions executable by the device to cause the device to in association with the bandwidth allocated to the terminals in the network being frozen, ignore the new bandwidth allocation requests and updates.

* * * * *